United States Patent
Li

(10) Patent No.: US 12,439,276 B1
(45) Date of Patent: Oct. 7, 2025

(54) SYSTEMS AND METHODS FOR WIRELESS NETWORK OPTIMIZATION USING GEO-DATA FOR IMPROVED USER EXPERIENCE

(71) Applicant: META PLATFORMS, INC., Menlo Park, CA (US)

(72) Inventor: Ying Li, Santa Clara, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 418 days.

(21) Appl. No.: 17/957,500

(22) Filed: Sep. 30, 2022

Related U.S. Application Data

(60) Provisional application No. 63/314,022, filed on Feb. 25, 2022.

(51) Int. Cl.
*H04W 16/28* (2009.01)
*H04W 24/02* (2009.01)

(52) U.S. Cl.
CPC ........... *H04W 16/28* (2013.01); *H04W 24/02* (2013.01)

(58) Field of Classification Search
CPC .............................. H04W 16/28; H04W 16/02
USPC ...................................................... 455/422.1
See application file for complete search history.

(56) References Cited

U.S. PATENT DOCUMENTS

| | | | |
|---|---|---|---|
| 9,585,037 B1 | 2/2017 | Davari et al. | |
| 10,039,016 B1 | 7/2018 | Larish et al. | |
| 10,785,101 B2 | 9/2020 | Li et al. | |
| 11,018,793 B2 | 5/2021 | Chen | |
| 2013/0303145 A1* | 11/2013 | Harrang | H04W 24/10 455/418 |
| 2016/0248496 A1* | 8/2016 | Bellamkonda | H04B 7/0413 |
| 2016/0345183 A1 | 11/2016 | Hamalainen et al. | |
| 2018/0206133 A1 | 7/2018 | Venkatraman et al. | |
| 2020/0351678 A1 | 11/2020 | Wang et al. | |
| 2020/0413459 A1* | 12/2020 | Yoon | H04W 52/40 |

FOREIGN PATENT DOCUMENTS

CN         109982354 A   *   7/2019

OTHER PUBLICATIONS

Machine translation of CN-109982354.*
Arieso Ltd., "Arieso GEO User Guide," Copyright 2012, 324 pages.
Forsk, "Measurement-Based Optimisation," Retrieved from Internet: https://www.forsk.com/measurement-based-optimisation, accessed on Oct. 4, 2022, 4 pages.

(Continued)

*Primary Examiner* — Qutbuddin Ghulamali
(74) *Attorney, Agent, or Firm* — EVERSHEDS SUTHERLAND (US) LLP

(57) ABSTRACT

A system for network optimization using geo-data may access a set of geotagged data samples associated with a cell. The set of geotagged data samples may be obtained from an application associated with one or more user equipment associated with the cell and the cell includes at least one antenna. The system may also determine a metric associated with the cell based on the set of geotagged data samples, generate one or more antenna adjustments based on the metric, and predict, based on the one or more antenna adjustments, a performance improvement associated with the cell.

19 Claims, 17 Drawing Sheets

(56) References Cited

OTHER PUBLICATIONS

Forsk, "RAN Optimisation," Retrieved from Internet: https://www.forsk.com/ran-optimisation, accessed on Oct. 4, 2022, 3 pages.
Forsk, "UE/Cell/MDT Traces," Retrieved from Internet: https://www.forsk.com/uecellmdt-traces, accessed on Oct. 4, 2022, 4 pages.
Rica D.A., et al., "Advanced Auto-Optimization and Management of Dual 2G/3.5G Radio Networks," IEEE Int'l Symposium on Broadband Multimedia Systems and Broadcasting, May 2009, 7 pages.
International Preliminary Report on Patentability for International Application No. PCT/US2023/013813, mailed Sep. 6, 2024, 6 pages.
International Search Report and Written Opinion for International Application No. PCT/US2023/013813, mailed May 22, 2023, 7 pages.

\* cited by examiner

SYSTEMS AND METHODS FOR WIRELESS NETWORK OPTIMIZATION USING GEO-DATA FOR IMPROVED USER EXPERIENCE

CROSS-REFERENCE TO RELATED APPLICATIONS

This application claims the benefit of U.S. Provisional Application No. 63/314,022 filed Feb. 25, 2022, the entire content of which is incorporated herein by reference.

BACKGROUND

Network optimization (e.g., parameter reconfiguration to improve network performance) and end user experience are issues in the field of wireless communications. Network performance and end user experience may be improved via tuning or reconfiguring parameters of the network hardware, such as radio-frequency-related parameters (e.g., antenna azimuth, tilts, transmit power, and the like) and other parameters (e.g., handover, load balancing, and the like). When the parameters are tuned or reconfigured, network coverage and/or capacity may be affected, resulting in better network performance and thus user experience. Improved network optimization solutions may benefit a content platform application (app) by allowing end users to have a better connectivity experience to the content platform app, thereby facilitating a better user experience with the content platform app.

Conventional network optimization may not utilize geolocation information (e.g., latitude/longitude or other location information) of the network's user devices, especially the geolocation information together with lower layer metrics (e.g., signal strength, signal quality, etc.) as well as the upper layer measurements (e.g., download speed and latency) that the end user experiences. The geolocation information as well as the lower/upper layer measurements/metrics may not be largely available together. However, such information may be useful for generating more robust network optimization solutions.

BRIEF SUMMARY

Systems and methods are disclosed herein for recommending solutions as well as a tool(s) for mobile network operators (MNO) to perform wireless network optimization. Accordingly, the approach of the exemplary embodiments may be considered unconventional wireless network optimization and over the top (OTT) wireless network optimization. Some example embodiments may include a method to: access a set of geotagged data samples associated with a cell, wherein the set of geotagged data samples are obtained from an application associated with one or more user equipment associated with the cell and the cell comprises at least one antenna; determine a metric associated with the cell based on the set of geotagged data samples; generate one or more antenna adjustments based on the metric; and predict, based on the one or more antenna adjustments, a performance improvement associated with the cell. Corresponding computer program products, systems and apparatuses may also be provided.

Methods of the exemplary embodiments may be implemented by a system including one or more hardware processors configured by machine-readable instructions and/or other components. The system includes one or more processors and other components or media upon which machine-readable instructions may be executed. Implementations of any of the described techniques and architectures may include a method or process, an apparatus, a device, a machine, a system, or instructions stored on computer-readable storage medium.

BRIEF DESCRIPTION OF THE DRAWINGS

In order to facilitate a fuller understanding of the disclosure, reference is now made to the accompanying drawings, in which like elements are referenced with like numerals. These drawings should not be construed as limiting the disclosure and are intended only to be illustrative.

DETAILED DESCRIPTION

Figure 1:
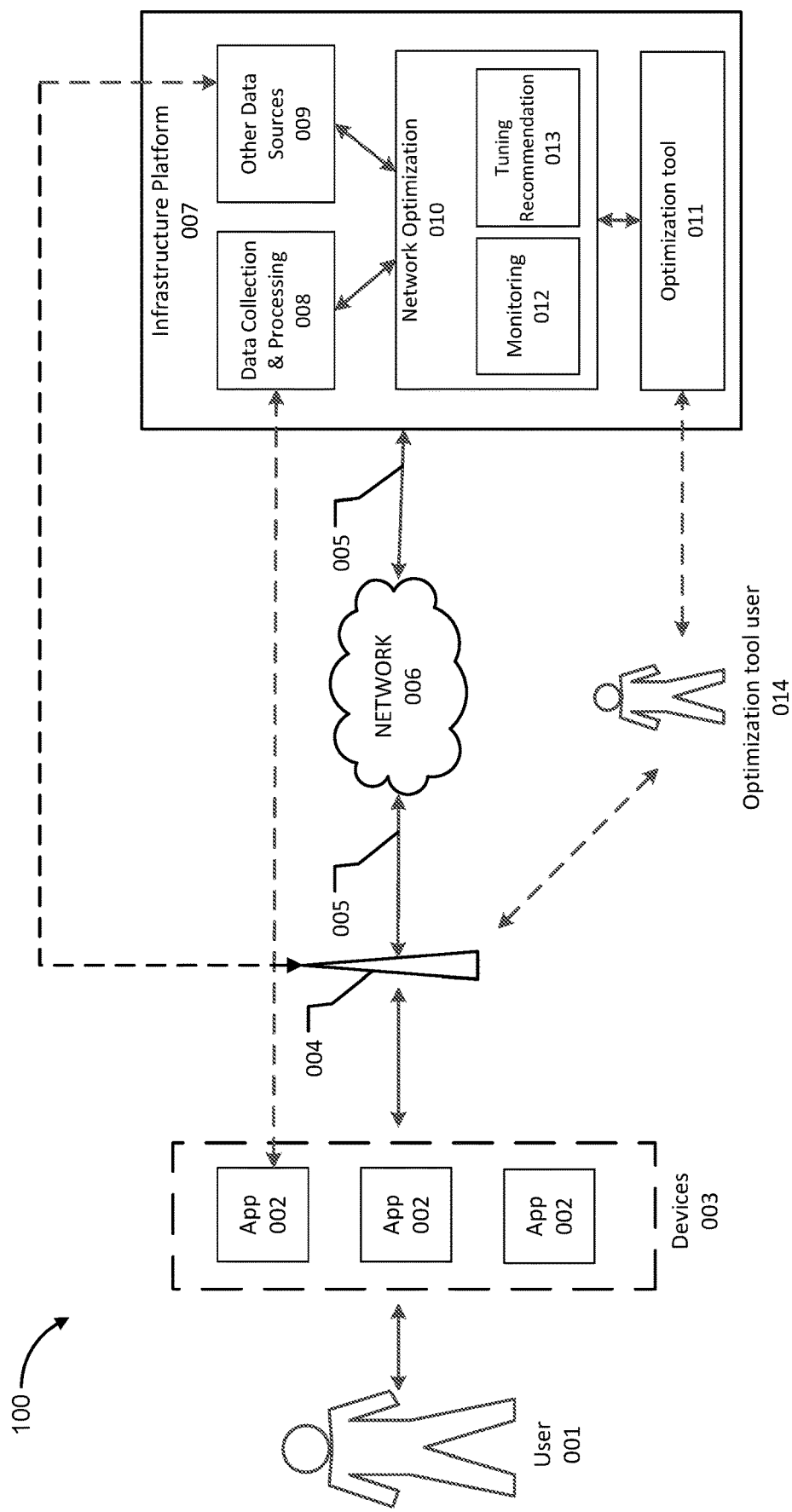
FIG. 1 illustrates an exemplary wireless network optimization system block diagram.

Before explaining at least one embodiment of the disclosure in detail, it is to be understood that the disclosure is not limited in its application to the details of construction and to the arrangements of the components set forth in the following description or illustrated in the drawings. The disclosure is capable of one or more embodiments in addition to those described and of being practiced and carried out in various ways. Also, it is to be understood that the phraseology and terminology employed herein, as well as the abstract, are for the purpose of description and should not be regarded as limiting.

Reference in this disclosure to "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described, which may be exhibited by some embodiments and not by others. Similarly, various requirements are described, which may be requirements for some embodiments but not by others.

As defined herein, a "computer-readable storage medium," which refers to a non-transitory, physical, or tangible storage medium (e.g., volatile or non-volatile memory device), may be differentiated from a "computer-readable transmission medium," which refers to an electromagnetic signal.

As referred to herein, a "cell" may be a hardware unit that provides wireless access to user equipment (UE). A UE may be a smartphone, a tablet, or any other electronic device. A cell may be included as part of a network having communication links to and from nodes (e.g., a UE) that may be wireless (e.g., cellular). A cell may include one or more antennas, transceivers, base stations, base transceiver stations, etc. The antennas/transceivers of a cell may provide communication (e.g., network) coverage such as, for example, cellular coverage, which may be utilized to transmit content among the nodes. A cell may have a geographic coverage area, also referred to as a cell coverage area. A cell, cellular access point, base station, cellular hardware unit, cell network, or cell coverage may be referred to herein interchangeably, unless otherwise specified.

As referred to herein, a "site" may be a set of hardware units having one or more associated cells. A site may also refer to a location where physical network hardware is located. A site may further refer to a geographic area that may include one or more cells. A site, site location, site mount, site pole, site coverage area, site network, and site for cells or sectors may be referred to herein interchangeably, unless otherwise specified. A site may include sectors or cells of one or multiple technologies, such as 2G, 3G, 4G, and 5G cellular radio access network technologies. A sector may include of one or more cells that cover a particular area in a particular direction for one or more frequency bands. In an instance in which a sector only has one cell, the sector and cell may be referred to herein interchangeably, unless otherwise specified.

As referred to herein, an "azimuth," or "antenna azimuth," may refer to an angular measurement in a spherical coordinate system relative to an antenna, base station, base transceiver station, and the like. Azimuth may be measured in degrees (e.g., 0 to 360 degrees), as the horizontal orientation or pointing direction of the center of the main lobe of the beam of an antenna.

As referred to herein, "overshooting" of a cell may refer to a scenario in which the cell's coverage is too large. Coverage is too large in an instance in which the coverage overlaps with other nearby cell coverages on the same frequency band or channel causing significant interference. To reduce interference, the overshooting cell may decrease its coverage while maintaining service quality.

As referred to herein, "undershooting" of a cell may refer to a scenario in which the cell's coverage is too small. Coverage is too small in an instance in which the coverage does not provide enough coverage area or service area (e.g., leaves coverage gaps in a given geographic area). An undershooting cell may increase its coverage such that it does not overlap other nearby cell coverages on the same frequency band or channel.

System Description

FIG. 1 is a block diagram of an exemplary wireless network optimization system, according to disclosed embodiments. In the system 100, an end user 001 uses an application software (app 002). The app 002 may be run/implemented on a device 003 (e.g., a UE). An app 002 may be a social networking app, but other types of apps are contemplated. The device 003 may be connected to one or multiple cells on a site 004. The site 004 may be a cellular Radio Access Network (RAN), a Wi-Fi network, etc. The site 004 may include one or more sites, each site including one or more cells having one or more antennas corresponding to a coverage area of a site. The site 004 may be connected to backhauls 005. The backhauls 005 may be connected to networks 006 where the networks 006 may include mobile core networks, the edge networks, the Internet, etc. The backhaul 005 and networks 006 may be managed by a mobile network operator (MNO), Internet Service Provider (ISP), etc. The content that a user may want to access via the app 002 may be stored in an infrastructure platform 007, which may be connected to the networks 006. An infrastructure platform 007 may include one or multiple data centers. The infrastructure platform 007 may be affiliated with the app 002.

The system 100 may also include data collection and processing modules 008, and other data source modules 009, for generating inputs to the network optimization module 010. The network optimization module 010 outputs recommendations for optimization based on the inputs, which may be used to provide or generate an optimization tool 011. The network optimization module 010 may be shown on the optimization tool 011 (e.g., via a user interface (UI), portals, web browser, etc.) for visualization, such that the users (e.g., MNOs, ISPs, and the like) of the optimization tool 011 may monitor and diagnose the performance of wireless networks 004 and end user experiences, view potential solutions, tuning recommendations, predicted performances, time series, maps, and the like. With the assistance of and/or through the optimization tool 011, the optimization tool users 014 may take actions to tune and/or monitor their wireless networks 004. For example, the optimization tool users 014 may interact with a UI to input information, receive recommendations via the UI based on the input information, and interact with the UI to optimize the wireless networks 004 and view their performance.

In the data collection and processing modules 008, the data may be collected and stored in the infrastructure platform 007. The data collection may be done, for example, via the app 002. The data collected may include metrics measured at the upper layers of the open systems interconnection (OSI) model (e.g., application and transport layers), which may be used to derive the download speed (e.g., kilobits per second (kbps)) and latency (e.g., round trip time (RTT)). The corresponding geolocation data (e.g., latitude/longitude) may also be collected if applicable. The data collected may also include the metrics measured at the lower layers of the OSI model (e.g., data link and physical layers), such as reference signal received power (RSRP), reference signal received quality (RSRQ), the cell identifier of the cell that is serving a device 003, the base station identifier of the cell (e.g., an evolved Node B (eNodeB) identifier for 4th generation cellular networks or a Next Generation Node B (gNodeB) identifier for $5^{th}$ generation cellular networks), or the site identifier of the cell. The data collected by the data collection and processing modules 008 may be referred to as geotagged data samples.

In the data collection and processing modules 008, the data samples may be processed. Processing may include cleaning and aggregating the data over a time window (e.g., hours, days, and the like). The data may be used as the input to the wireless network optimization module 010 for generating optimizations for the corresponding wireless network.

The other data source modules 009 may include wireless network layout (e.g., site locations), parameter values (e.g., azimuth angle, tilts, transmit power), and/or the like. The wireless network optimization module 010 may perform data analytics, modeling, machine learning, wireless domain knowledge-based rules, and/or the like. The wireless network optimization module 010 may also include a monitoring/diagnosis module 012 for monitoring networks and diagnosing poor network performances (e.g., anomaly detection, root cause analysis for poor performance/experiences, and the like). The wireless network optimization module 010 may also include cross-layer optimization for identifying optimization opportunities affecting the upper and lower layer metrics. The wireless network optimization module 010 may also include an optimization tuning module 013, where the tuning and reconfiguration recommendations may be made. Recommendations may include predicted performances for recommendations if implemented. The parameters may include the azimuth angle, tilts, and transmit power for each cell (e.g., radio access point in a cellular network) of the site 004.

Exemplary System Architecture

Figure 2A:
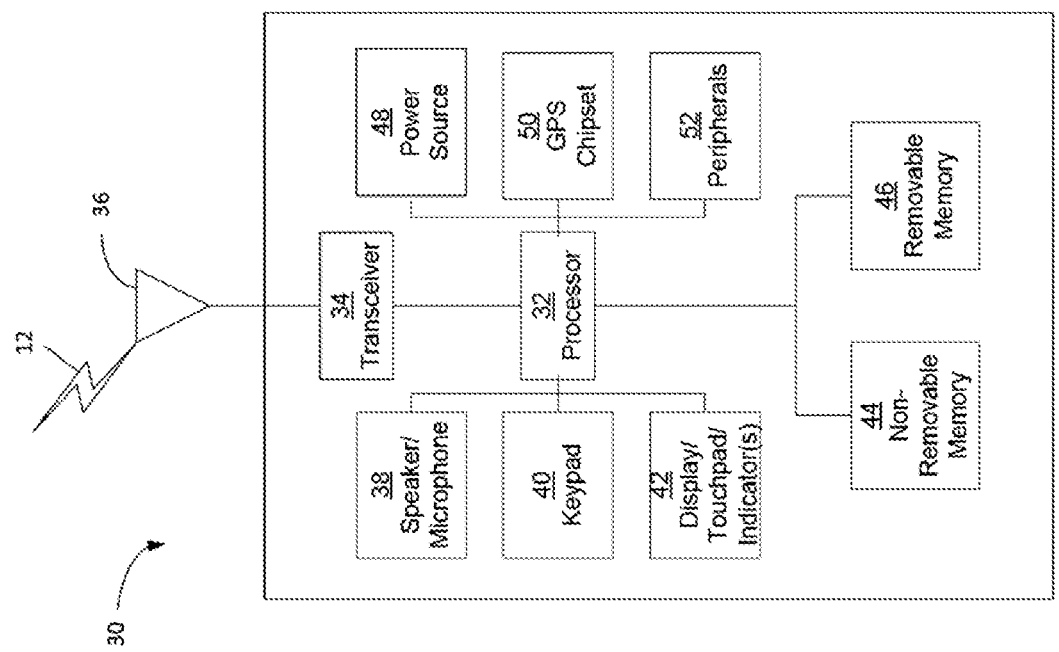
FIG. 2A illustrates a system diagram of an exemplary system.

FIG. 2A is a block diagram of an exemplary hardware/software architecture of a system 30 at a network (e.g., site 004). The system 30 may also be referred to herein as computer system 30. The system 30 may be an example embodiment of a device such as a client, server, proxy that may operate as a server, gateway, or edge device in the network. The system 30 may include a processor 32, non-removable memory 44, removable memory 46, speaker/microphone 38, keypad 40, display/touchpad/indicators 42, power source 48, global positioning system (GPS) chipset 50, and other peripherals 52. The herein-disclosed system may also include communication circuitry, such as a transceiver 34 and a transmit/receive element 36. The system 30 may include all or any combination of the foregoing elements.

The processor 32 may be a special purpose processor, a digital signal processor (DSP), a plurality of microprocessors, one or more microprocessors in association with a DSP core, a controller, a microcontroller, application-specific integrated circuits (ASICs), field programmable gate array (FPGAs) circuits, any other type of integrated circuit (IC), a state machine, and/or the like. In general, the processor 32 may execute computer-executable instructions stored in the memory (e.g., the non-removable memory 44 and/or the removable memory 46) of the system 30 to perform the various functions of the exemplary embodiments. For example, the processor 32 may perform signal coding, data processing, power control, input/output processing, and/or any other functionality that enables the system 30 to operate in a wireless or wired network environment. The processor 32 may run application layer programs, such as web browsers, RAN programs, and/or other communications programs. The processor 32 may also perform security operations, such as authentication, security key agreement, and/or other cryptographic operations. The security operations may be performed, for example, at the session layer and/or application layer.

The processor 32 is coupled to other modules (e.g., transceiver 34 and transmit/receive element 36) via communication circuitry. The processor 32, through the execution of computer-executable instructions, may cause the system 30 to communicate with other devices via the network to which it is connected. While the processor 32 and the transceiver 34 are depicted as separate components, the processor 32 and the transceiver 34 may be integrated together (e.g., in an electronic package or chip).

The transmit/receive element 36 may be configured to transmit signals to, or receive signals from, other devices, including servers, gateways, wireless devices, and the like. For example, transmit/receive element 36 may be an antenna configured to transmit and/or receive RF signals. In some example embodiments, the transmit/receive element 36 may support various network(s) interfaces, such as wireless local area network (WLAN), wireless personal area network (WPAN), cellular, and the like. In an example embodiment, the transmit/receive element 36 may be an emitter/detector configured to transmit and/or receive signals such as for example infrared (IR), ultraviolet (UV), or visible light signals, for example. In some example embodiments, transmit/receive element 36 may be configured to transmit and receive both RF and light signals. In some example embodiments, the transmit/receive element 36 may be configured to transmit and/or receive any combination of wireless or wired signals.

In addition, although the system 30 is depicted as having a single transmit/receive element 36, the system 30 may include any number of transmit/receive elements 36. In some example embodiments, the system 30 may employ multiple-input and multiple-output (MIMO) technology and thus may include two or more transmit/receive elements 36 (e.g., multiple antennas) for transmitting and receiving wireless signals.

The transceiver 34 may be configured to modulate the signals transmitted by the transmit/receive element 36 and/or to demodulate the signals received by the transmit/receive element 36. As noted above, the system 30 may have MIMO capabilities. Thus, the system 30 may include multiple transceivers 34 for communicating with multiple radio access technologies (RATs) (e.g., Universal Terrestrial Radio Access (UTRA) and IEEE 802.11).

The processor 32 may access information from, and store data in, any type of suitable memory, such as the non-removable memory 44 and/or the removable memory 46. For example, the processor 32 may store session context information in its memory, as described above. The non-removable memory 44 may include random access memory (RAM), read-only memory (ROM), hard disks, or any other type of memory storage device. The removable memory 46 may include a subscriber identity module (SIM) card, a memory stick, a secure digital (SD) memory card, and the like. In other example embodiments, the processor 32 may access information from, and store data in, memory that is not physically located on the system, such as on a remote server or a home computer.

The processor 32 may receive power from the power source 48 and may be configured to distribute and/or control the power to the other components in the system 30. The power source 48 may be any suitable device for powering the system 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of devices associated with the system 30. The GPS chipset 50 may acquire location information by way of any suitable location-determination method.

The processor 32 may be coupled to other peripherals 52, which may include one or more software and/or hardware modules that provide additional features, functionality, and/or wired or wireless connectivity. For example, the peripherals 52 may include various sensors such as an accelerometer, an e-compass, a satellite transceiver, a sensor, a digital camera (e.g., for photographs or video), a universal serial bus (USB) port or other interconnect interfaces, a vibration device, a television transceiver, a hands free headset, a Bluetooth module, a frequency modulated (FM) radio unit, an Internet browser, and the like.

The system 30 may be embodied in other apparatuses or devices (e.g., smartphones, tablets, desktop computers, laptop computers, and the like). The system 30 may connect to other components, modules, or systems of such apparatuses or devices via one or more interconnect interfaces, such as an interconnect interface that may comprise one of the peripherals 52.

Figure 2B:
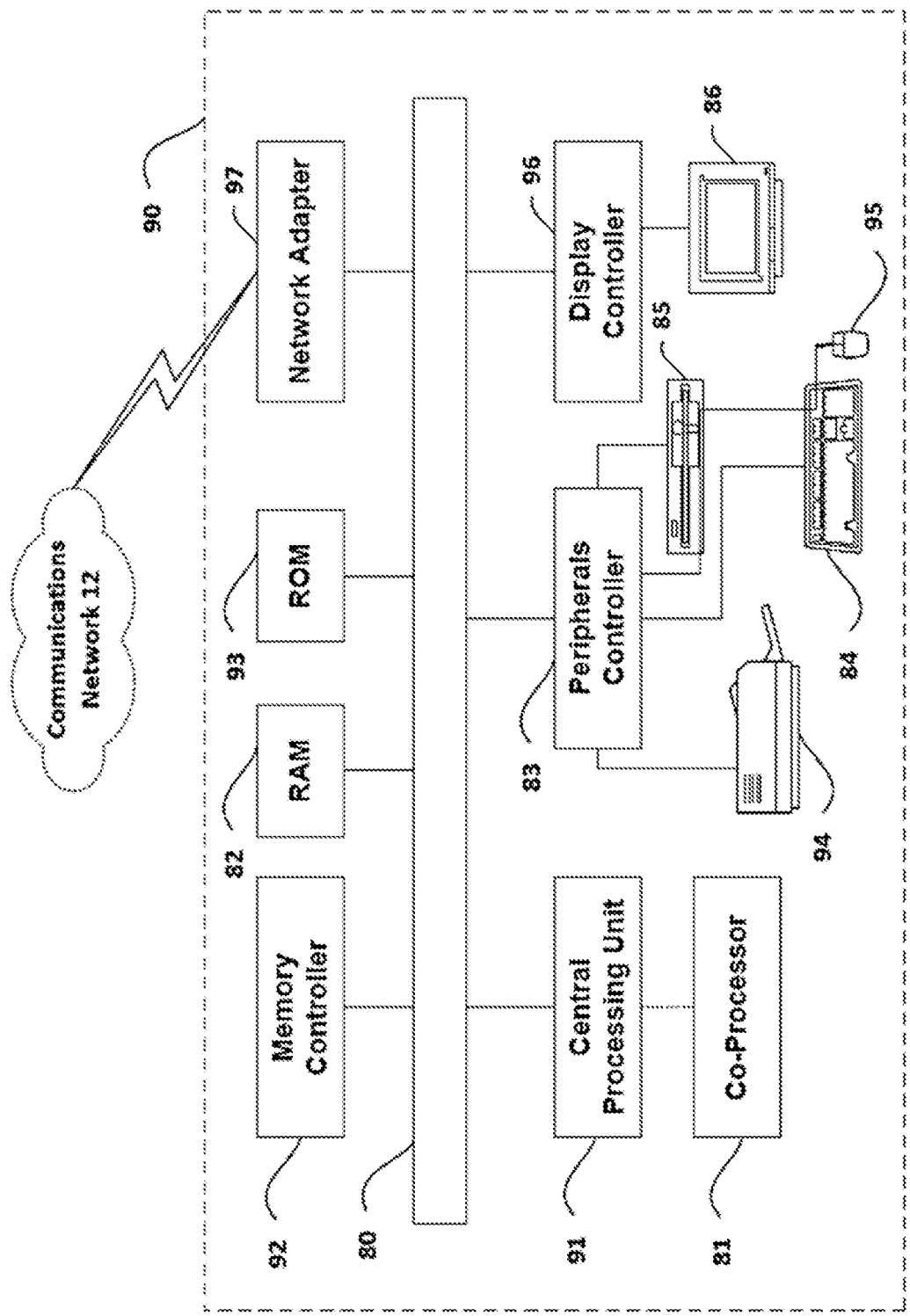
FIG. 2B illustrates a block diagram of exemplary computing peripherals of the system.

FIG. 2B is a block diagram of an exemplary computing system 90 that may be used to implement one or more systems (e.g., clients, servers, controllers, data analyzers, cloud computing units, or proxies) of a network, and which may operate as a server, gateway, controller, data analyzer, cloud computing unit, device, or edge device in a network. The computing system 90 may comprise a computer or server and may be controlled primarily by computer-readable instructions, which may be in the form of software, by whatever means such software is stored or accessed. Such computer-readable instructions may be executed within a processor, such as a central processing unit (CPU) 91 to cause computing system 90 to effectuate various operations. The CPU 91 may be implemented by a single-chip CPU called a microprocessor. The CPU 91 may be implemented by multiple processors, including graphics processing units (GPUs). A co-processor 81 is an optional processor, distinct from CPU 91, that performs additional functions or assists the CPU 91.

In operation, CPU 91 fetches, decodes, executes instructions, and transfers information to and from other resources via the computer's main data-transfer path, system bus 80. The system bus 80 connects the components in the computing system 90 and defines the medium for data exchange. The system bus 80 typically includes data lines for sending data, address lines for sending addresses, and control lines for sending interrupts and for operating the system bus 80. An example of the system bus 80 is the peripheral component interconnect (PCI) bus.

Memories coupled to system bus 80 include RAM 82 and ROM 93. Such memories include circuitry that allows information to be stored and retrieved. ROM 93 generally contains stored data that cannot easily be modified. Data stored in RAM 82 may be read or changed by the CPU 91 or other hardware devices. Access to RAM 82 and/or ROM 93 may be controlled by a memory controller 92. The memory controller 92 may provide an address translation function that translates virtual addresses into physical addresses as instructions are executed. The memory controller 92 may also provide a memory protection function that isolates processes within the system and isolates system processes from user processes. Thus, a process may access only memory mapped by its own virtual address space. It may be unable to access memory within another process's virtual address space unless memory sharing between the processes has been set up.

In addition, the computing system 90 may contain a peripherals controller 83 responsible for communicating instructions from CPU 91 to peripherals, such as printer 94, keyboard 84, mouse 95, and disk drive 85.

A display 86, which is controlled by display controller 96, is used to display visual output generated by computing system 90. Such visual output may include text, graphics, animated graphics, and video. In some embodiments, the display 86 may be implemented with a cathode-ray tube (CRT)-based video display, a liquid crystal display (LCD)-based flat-panel display, gas plasma-based flat-panel display, or a touch-panel. The display controller 96 includes electronic components required to generate a video signal that is sent to display 86.

Wireless Network Optimization

In some example embodiments, wireless connections may be made more efficient by adjusting cell parameters (e.g., antenna tilt or azimuth). For example, wireless frequency spectrum efficiency may be increased, and wireless resource utilization may be improved. More efficient wireless connections may improve user experience. For example, download speeds may be increased, network resources may be more available, and network demand may be less suppressed.

In some embodiments, measurements having an associated geolocation (e.g., latitude/longitude) may be obtained. Measurements may include lower layer metrics, such as signal strength (e.g., RSRP, received signal strength indicator (RSSI), synchronization signal received power, and the like), signal quality (such as RSRQ, synchronization signal received quality, and the like), signal to interference and noise ratio (SINR), and the like. Measurements may also include upper layer metrics, such as download speed, latency, downstream latency, congestion, number of samples (e.g., traffic demand), video playback metrics (e.g., stall ratio, the initial stall time before playback starts, the time in-between rebuffering, the mean opinion score (MOS), etc.), and the like. The end users' devices (e.g., devices 003) may act as sensors distributed across the physical area covered by one or more wireless networks (e.g., site 004). The wireless network optimization solution may utilize a geotagged dataset from end user devices for tuning antenna azimuth, tilt, transmit power, etc., to change coverage and/or capacity of a wireless network. Such geotagged datasets enable an enhanced understanding of the coverage of cells, the distribution of the signal strength, and other wireless network attributes to visualize performance and generate optimizations.

In some example embodiments, the system (e.g., system 30) may have different optimization objectives. For example, a maximum download speed or downstream latency minimization may be targeted. In some embodiments, the objective may be to ensure that the tail performance or that devices in a bad wireless link environment may still have good enough service performance or quality. For example, the objective may be to maximize the 5th percentile value of all the samples associated with a cell, where the samples are measuring a signal power (e.g., RSRP) or signal quality (e.g., RSRQ) metric. When a cell has a better distribution of signal power or signal quality (e.g., RSRP or RSRQ, respectively) in an area of very low signal power or signal quality, the 5th percentile value of signal power or signal quality may increase. Different objectives may be weighted differently, which may affect whether and how much signal power or signal quality should be adjusted.

In some embodiments, tuning knobs for adjusting parameters (e.g., antenna azimuth, tilt, transmit power, etc.) may be implemented. The post-tuning network performance (e.g., download speed or latency) at the upper layers versus the post-tuning network performance at the lower layer (e.g., signal power strength or signal quality) may be modeled. Some network performances might react more in response to a tuning (more sensitive to RSRP or RSRQ) while some network performances may improve only slightly, if at all (due to limiting factors such as congested backhaul, etc.). For example, cells with higher sensitivities may be prioritized to see more immediate results. As such, tuning iterations may be performed through the remaining cells.

In some embodiments, a model (e.g., machine learning (ML) model, regression model) may be generated based on the metrics associated with location information corresponding to a cell.

Figure 3B:
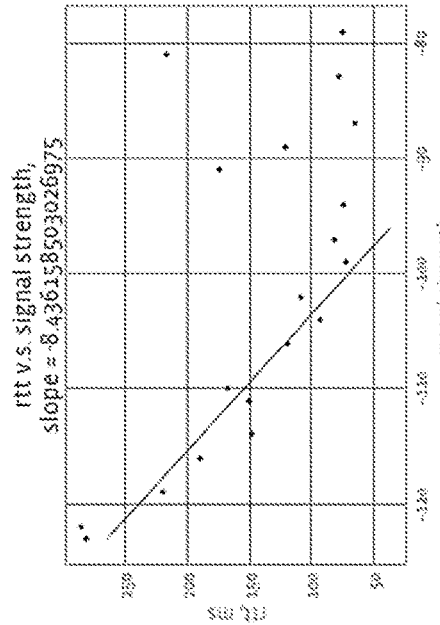
FIG. 3 illustrates predicted gains when tuning is performed based on sensitivity to the tuning, according to an aspect of the disclosure.
Figure 3D:
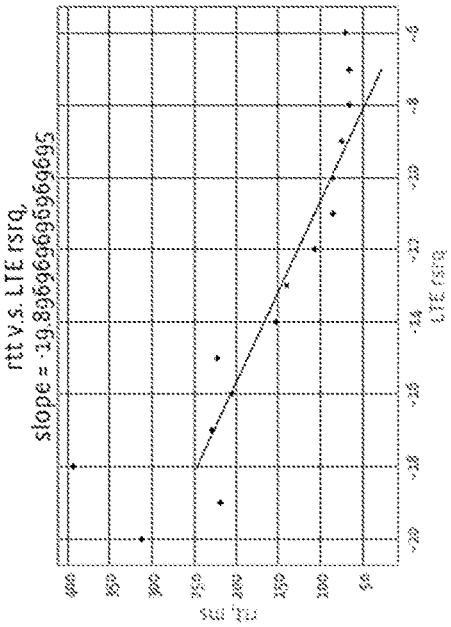
Figure 3A:
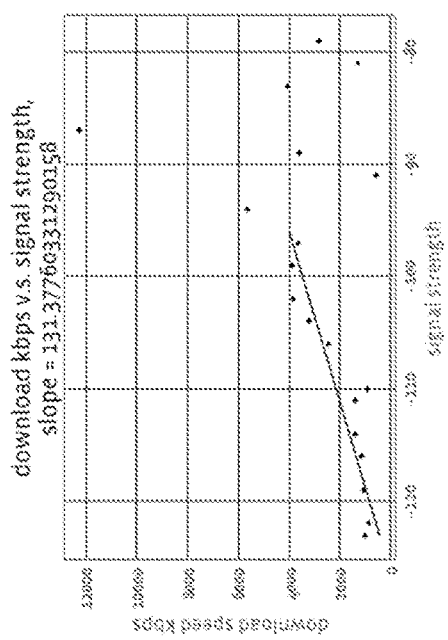

In some embodiments, a regression model may be generated (e.g., for estimating an effect of tuning). In some examples, the regression model may be implemented/executed by a network device (e.g., computing system 90). The regression model may be a linear regression model (e.g., linear regression models shown in FIG. 3A, FIG. 3B, FIG. 3C, and FIG. 3D). In FIGS. 3A-3D, each data point may be a statistical metric of the geotagged dataset for each unit on each axis. For example, the first data point of FIG. 3A is plotted on the x-axis of the linear regression model having a median value of all the samples having RSRP values >=−125 dBm and <−122.5 dBm and the corresponding y-axis value having the median value of all the samples of kbps associated with the same RSRP values. The regression model may be applied to all the data points across the x-axis, or a portion of the x-axis. For example, the model of FIG. 3A applies regression for the data points with RSRP<=−95 dBm, as it may be desirable to improve the lower end of the RSRP in this instance. The regression model may also ignore the data points where there may not be as many samples for an interval (e.g., below a threshold value). As such, the data points may not be used in the model to compute the slope of the regression. For example, a data point for an RSRP interval may have a minimum threshold of 20 or 30 samples for the data point to be plotted.

In some embodiments, a model may be generated to predict the improvement of upper layer metrics based on the tuning of lower layer metrics. Sensitivity may thus be derived for upper layer metrics (e.g., download speed, latency) based on lower layer metrics (e.g., RSRP, RSRQ) by observing the slope of the linear regression.

In some embodiments, a model may be generated with geolocation data of the cell center, a distance from the site to the cell center, and/or a site to cell range to recommend tuning parameters, such as antenna azimuth, tilt, transmit power, and the like. In an example, a tuning for antenna azimuth of a site/cell may be recommended based on the geographical distribution of the data samples (e.g., to determine the cell center). In this or another example, a tuning for antenna tilt and transmit power may be recommended based on the antenna height, distance of the site to the cell center, the cell radius, and/or the geographical distribution of the data samples logged.

In some embodiments, models may be generated iteratively. The models may be generated for optimizing lower layer metrics (e.g., to reduce the tail probability that a metric is worse than a threshold, where the threshold is a minimum required value for a target service level of the network) and/or upper layer metrics (e.g., download speed, latency), etc. At each iteration, a set of cells may be chosen for tuning based on their metrics (e.g., RSRP, RSRQ, kilobit per second (kbps), round trip time (RTT), etc.) and/or their sensitivity (e.g., the degree of change in kbps or RTT in response to changes in RSRP and/or RSRQ). The cells with higher sensitivity may have a higher priority for iteration. Cells nearby the tuned cells may be jointly optimized (e.g., optimized alongside the tuned cells) based on their cell radius, site to cell range, and/or geographical distribution of the data samples.

In some embodiments, an iterative process may be used to optimize wireless networks. For each iteration, a subset of the cells having an attribute with the poorest metric (e.g., the worst RSRP and/or RSRQ, the longest distance from site to the cell center, etc.) may be chosen to be tuned and optimized. The location information (e.g., latitude/longitude) of the samples logged from user devices (e.g., via an app) may be used to determine the quality (e.g., sensitivity) of the metric (e.g., via the relationship of the download speed, latency, etc. logged at the app and the RSRP and/or RSRQ).

In some example embodiments, azimuth tuning may be performed as part of the optimization process. For example, location information (e.g., latitude and longitude values) of the geotagged data set samples may be logged from a user device (e.g., via an app). The cell center may be determined using the location information of the samples. The azimuth angle tuning amount (e.g., degree) may be determined (e.g., by the computing system 90) by determining the difference between the current azimuth angle and the azimuth angle pointing toward the cell center. The exemplary embodiments may be beneficial in enabling MNOs to accurately determine a center of a cell (e.g., where more user devices may be located). As such, the exemplary embodiments may solve technical problems associated with existing/conventional systems since an MNO(s) in existing/conventional systems may not be able to identify a center of the cell accurately as the MNO(s) may not have the location information of some of the user devices operating in the cell.

In some embodiments, the determined azimuth angle tuning amount may be used to determine the prioritized cells, sites, and/or geographic area (e.g., represented by tiles, polygons, or other shapes) for optimization, planning, and the like. For example, an azimuth angle tuning amount may first be derived on a per cell basis; then, a geographic area score may be determined (e.g., by the computing system 90) by using the sensitivity values of the cells of a geographic area (e.g., site or area represented by a shape such as a tile, polygon, etc.), which may be an average value weighted by the number of samples in the cell. Similarly, a geographic area score may be determined, by computing system 90, by using the sensitivity values over the cells overlapping with a particular geographic area. Based on the score, cells having a higher azimuth angle tuning amount may have a higher priority to be optimized or upgraded. The geographic area score may also be determined (e.g., by the computing system 90) by combining other metrics, such as upper layer metrics and/or lower layer metrics.

In some embodiments, a setting by a network operator (e.g., MNO) may be configured such that a recommendation of those cells whose sensitivity (e.g., app layer kbps versus RSRP or RSRQ) is higher than a threshold level may be tuned.

In some embodiments, a sensitivity of upper layer metrics (e.g., download speed, RTT, and/or downstream latency) to lower layer metrics (e.g., RSRP and/or RSRQ) may be determined by computing system 90. In an example, geolocations may be used, by computing system 90, to select the areas having low value lower layer metrics and a slope that is high, which indicates higher sensitivity relative to upper layer metrics. In this or another example, geolocations may be used to select the areas having low lower layer metrics and high distance but with a high slope. The selection may alternatively or additionally be based on a country level, region level, etc.

In some embodiments, signal strength (e.g., RSRP) with location information may be obtained to indicate the coverage area. In other embodiments, signal quality (e.g., RSRQ) with location information may be obtained to indicate the coverage capacity. In some embodiments, upper layer metrics (e.g., download speed, latency, downstream latency, congestion, number of samples (e.g., traffic demand), video playback metrics, and the like) may be obtained with location information (e.g., by the computing system 90) to measure user experience. Geotagging herein may refer to being associated with location information (e.g., latitude and longitude).

By utilizing the location information, the computing system 90 may enable wireless spectrum efficiency to be increased and wireless resources to be better allocated, resulting in improved end user experience and platform usage (e.g., increased engagement).

Disclosed are systems and methods for a network optimizer. A network topology may be obtained (e.g., from an MNO). A geotagged dataset may be obtained (e.g., from an app on multiple user devices). The network topology and a geotagged dataset may be used, by computing system 90, to provide tuning recommendations. The computing system 90 may create optimization projects, select the cells in an area recommended for optimization, determine the geographical distribution of traffic demand, and/or determine an action (e.g., tuning). The computing system 90 may record the actual actions on a UI. The computing system 90 may monitor the performance following the actions via the UI and repeat tuning as needed (e.g., by recommendation). The computing system 90 may perform iterative tuning, where cells are tuned until selected performance attribute(s) are optimized for the selected area.

In some embodiments, lower layer metrics (e.g., RSRP and RSRQ) may be estimated, by computing system 90, after the azimuth tuning. For example, metrics of the cells covered post-tuning may be estimated, by computing system 90, based on the observed metrics of cells covered pre-tuning (e.g., the current cells). In an example embodiment, post-tuning metrics may be estimated, by computing system 90, by using a digital map and adjusting the path loss (e.g., path loss associated with buildings, foliage, etc. along a path). A tuning degree amount may be determined, by computing system 90, so as to avoid generating a coverage hole caused by the path loss.

Figure 3C:
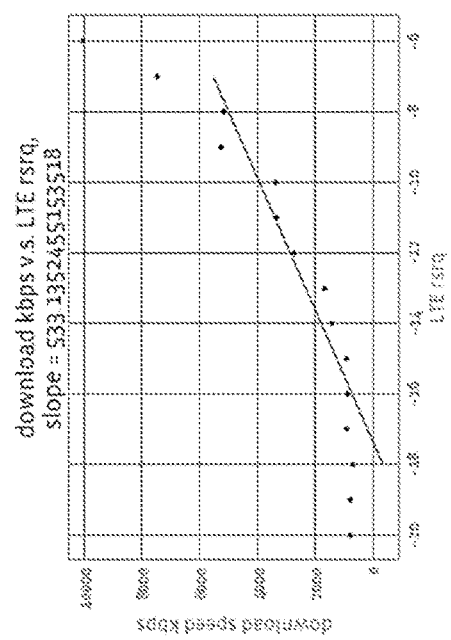

FIG. 3A, FIG. 3B, FIG. 3C, and FIG. 3D shows exemplary performance plots. For example, in FIG. 3A, FIG. 3C, both y-axes indicate download speed (in kbps) and the x-axes in FIG. 3A indicates signal strength and the x-axis in FIG. 3C indicates LTE RSRQ. By measuring, via computing system 90, an improvement of the signal strength or quality (e.g., LTE RSRQ), an amount of download speed improvement may be predicted (e.g., extrapolated), by computing system 90. For example, if the slope from the plots of FIGS. 3A and 3C is flat, then the sensitivity of signal strength or signal quality, determined by computing system 90, may be such that an improvement in signal strength or signal quality may not be reflected in the download speed. This may be because of bottlenecks, congestion, interference, or other issues. A high sensitivity (e.g., the plots of FIGS. 3A and 3C have a high slope) may indicate that the signal strength or RSRQ of the radio should be tuned.

In some embodiments, the sensitivity is determined (e.g., via regression slope) for upper layer (e.g., layer 4, 5, 6, or 7 of the OSI model) metrics (e.g., download speed, downstream latency, etc.) compared to lower layer (e.g., layer 1, 2, or 3 of the OSI model) metrics (e.g., RSRP, RSRQ, etc.). Such data may be obtained and logged from user devices (e.g., computer system 30) via an app (e.g., via an application programming interface (API) of the app). The upper layer metrics may be very close to indicating how the user is experiencing the app's service, such as the provisioning of content on the app.

In some embodiments, the determined sensitivity may be used, by computing system 90, to predict a change in upper layer metrics (e.g., download speed, latency, etc.) if the lower layer metrics (e.g., RSRP, RSRQ) are tuned.

Figure 4:
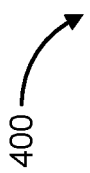
FIG. 4 illustrates a table of network optimization, according to an aspect of the disclosure.

FIG. 4 illustrates exemplary optimization performance prediction in response to tuning lower layer metrics. In the example, if the signal strength is improved by 2.5 dBm, then the respective gain in download speed, latency, and downstream latency are predicted for each cell. If RSRQ is improved by 1 dB, then the respective gain in download speed, latency, and downstream latency are predicted for each cell. In this table, cell_x4 has the highest predicted gain in download speed, indicating that it may get a download speed improvement of 400 kbps, if the signal strength is improved by 2.5 dBm. cell_x1 has the highest predicted gain in downstream latency, indicating that it may get a downstream latency improvement of 5.3 milliseconds, if RSRQ is improved by 1 dB.

In an example embodiment, this sensitivity may be used (e.g., by computing system 90) to determine which cells, sites, geographic areas (e.g., tiles, polygons) should be prioritized for optimization and planning purposes. For example, cell(s) may be selected (e.g., by computing system 90) based on the cell(s) determined sensitivity to RSRP and/or RSRQ tuning in wireless network optimization.

In some embodiments, a sensitivity value may be determined by computing system 90 for a cell. A score may be determined by computing system 90 for a geographic area (e.g., site or shape representing an area such as a tile, polygon, etc.) based on the sensitivity values of the cells associated with the geographic area. The score may indicate the priority level (e.g., cell or site ranking) of the geographic area for tuning. For example, the score may be an average of sensitivity levels weighted by the number of samples in the cells of a geographic area. Similarly, a score may be determined by the computing system 90 by using the sensitivity values of the cells overlapping the geographic area. A geographic area may be prioritized based on the score such that an area of higher sensitivity may have a higher priority for optimization or upgrading.

In a UI of a device (e.g., computer system 30), a user may select a cell of a site. In response, the tiles covered by this cell may be shown via a display. Different colors may be used to depict different information, such as metrics or overlap with other cells.

In some embodiments, the determined sensitivity may be used (e.g., by the computing system 90) to predict/determine improvement in upper layer metrics (e.g., kbps, RTT, or another attribute) if the lower layer metrics (e.g., RSRP and/or RSRQ) is improved. In some embodiments, the cell center may be determined by using the location information (e.g., latitude/longitude) of the samples logged from user devices (e.g., via an app). For example, the distance between the site to the cell center may be determined by the computing system 90 using the location information of the samples (e.g., obtained from the app). In an example, the azimuth angle tuning amount (e.g., in degrees) may be determined, by computing system 90, by determining the difference between the current azimuth angle and the azimuth angle that points toward the cell center.

Figure 5:
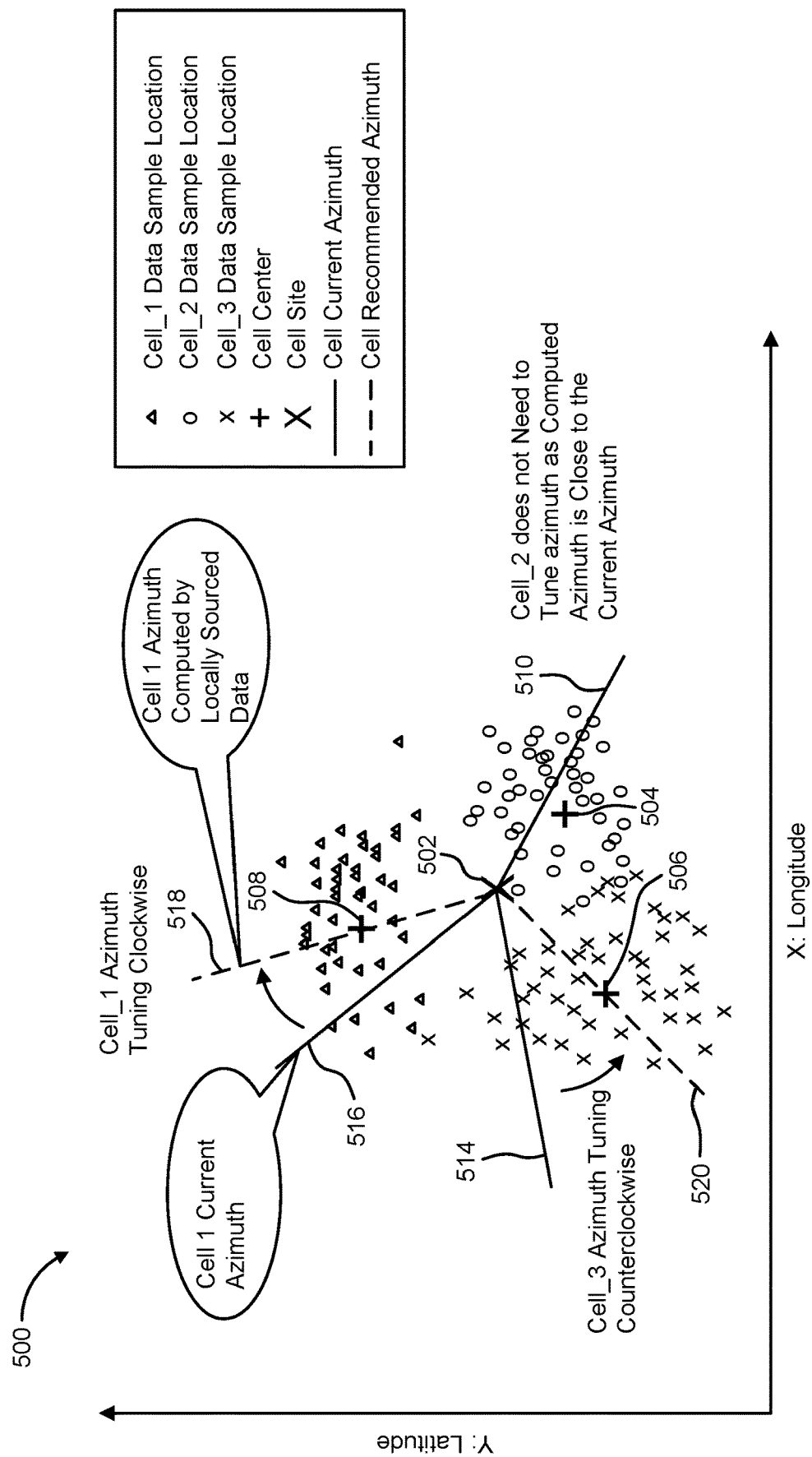
FIG. 5 illustrates potential optimization, particularly azimuth tuning opportunities, according to an aspect of the disclosure.

FIG. 5 depicts azimuth tuning opportunities. The azimuth 514 of cell_3 may be tuned counterclockwise. The azimuth 516 of cell_1 may be tuned clockwise. For example, there may be a suspected presence of trees or few data samples along the azimuth 516 of cell 1. The signal strength after tuning the azimuth may be estimated. If the estimated signal strength is beyond an acceptable threshold, then the tuning may be acceptable.

The center of the plot is the site 502, and the center of cell 1 508 is located northwest of the site 502. The cell center 504, 506, 508 may be determined (e.g., by computing system 90) by averaging the location information of the samples associated with an identifier (ID) of the cell. For example, a centroid method may be used (e.g., by the computing system 90) to determine the centers 504, 506, 508 of the location data of the data samples, where the centers 504, 506, 508 may correspond to a cell with which the respective data samples are associated. The centroid method may be used to determine the geographical center of data samples (e.g., by latitude and longitude). The data samples may be preprocessed (e.g., by removing outliers), after which the centers 504, 506, 508 may be determined (e.g., by clustering). Preprocessing of the data samples may include, for example, removing outlier data samples. The outlier data sample may be, for example, a distance from a cell that is farther than a majority (e.g., 90% of all samples) of the other data samples associated with the cell.

The determined or recommended azimuth 518, 520 is the azimuth pointing toward the cell center 504, 506, 508 from the site 502 location (e.g., shown as a dashed line). The computing system 90 may determine/recommend the azimuth. The current azimuth 510, 514, 516 is the line extending from the site 502 location (e.g., shown as a solid line). The recommended tuning angle (e.g., how many degrees to turn the current azimuth) is the angle from the current azimuth 510, 514, 516 to the recommended azimuth 518, 520. For example, the tuning recommendation, determined by computing system 90, for cell_1 may be to turn the azimuth 516 clockwise (e.g., 25 degrees) to better point an antenna associated with a cell 1 to where the users are located (or where a majority of the users associated with cell 1 are located.

If the current azimuth of a cell is unknown, then the dashed line may be provided (e.g., via the UI) to show the recommended azimuth 518, 520. If the current azimuth of a cell is known, then both the solid line and dashed lines may be provided, as well as the recommended tuning angle (e.g., the degree from the solid line to the dashed line). The information may be provided (e.g., by the computing system 90) to a user device (e.g., computer system 30), for example, associated with the site's MNO.

Figure 6:
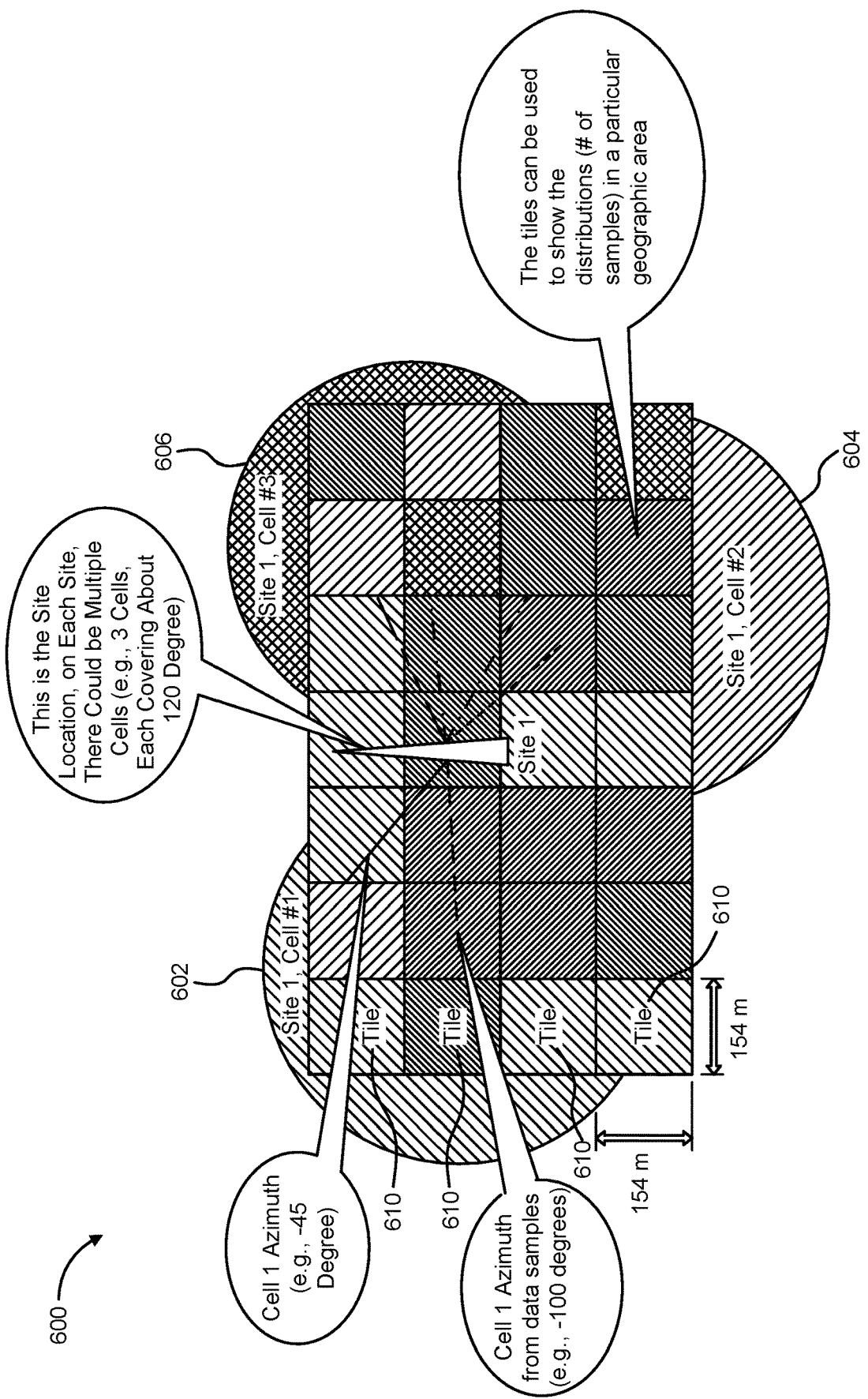
FIG. 6 illustrates potential optimization, particularly antenna azimuth, antenna pattern, and/or beam steering radio frequency (RF) tuning, according to an aspect of the disclosure.

FIG. 6 depicts an example visualization 600 of an antenna azimuth tuning case. The geographical area is represented by tiles 610, each having a depiction or color to represent one or more metrics. The tile 610 may represent the aggregated statistics of the metric of the tile 610 (e.g., percentile values) of all the samples located within the tile 610. For example, the metric of a tile 610 may be RSRP, and the tile 610 may be depicted/colored according to one of the $10^{th}$, $50^{th}$, or $90^{th}$ percentile values of all the samples located within this tile 610. Additionally or alternatively, the visualization for the tiles 610 may be based on their corresponding cell 602, 604, 606 such that the tiles 610 are depicted/colored according to the metrics of the samples in the cell 602, 604, 606 rather than the tile. In some embodiments, instead of showing tile-level metrics, the distribution within a cell 602, 604, 606 may be shown, with the depiction/color scales indicating the metrics. For example, if there are three cells 602, 604, 606, the three individual depiction/color-maps of the values for metrics with geographical distribution of each cell 602, 604, 606 may be visualized, respectively.

Figure 7:
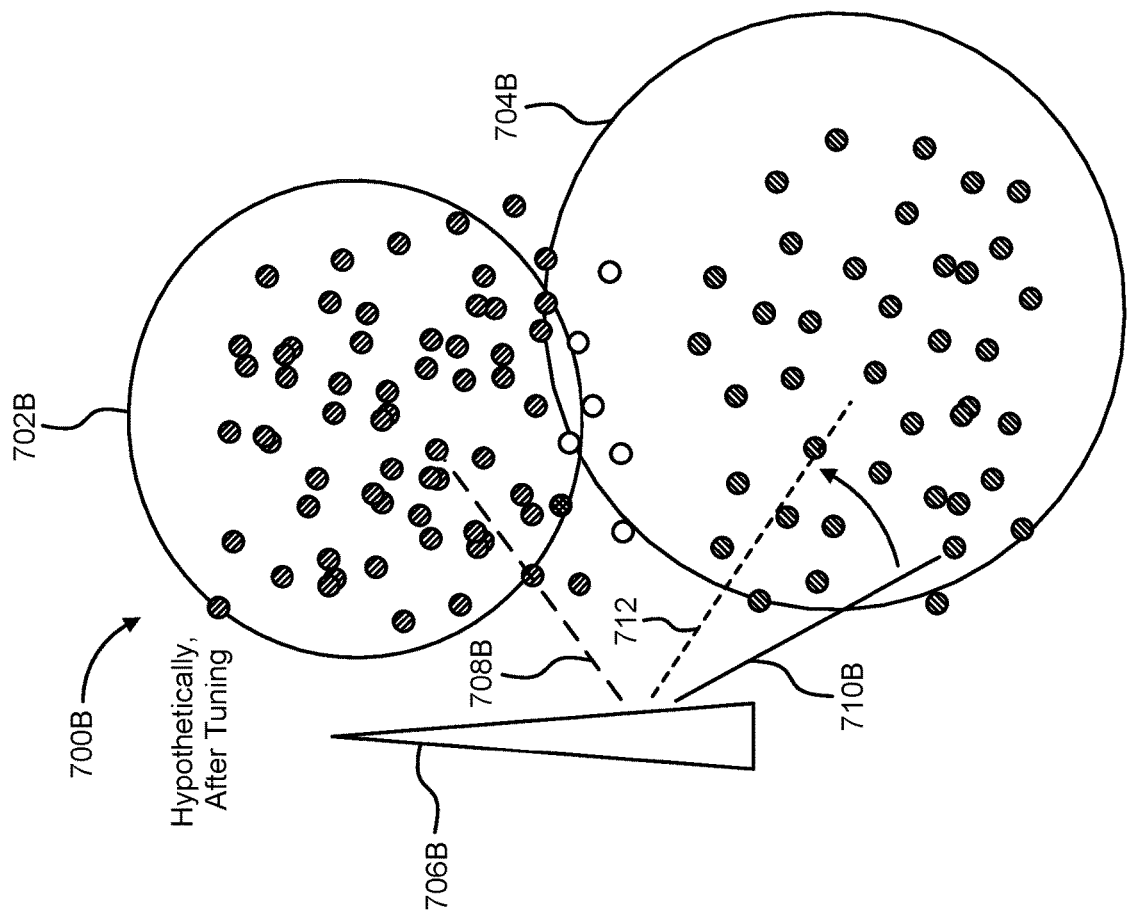
FIG. 7 illustrates an estimation or prediction of post-azimuth tuning, particularly where samples originally withing cell 1 are now in cell 2, according to an aspect of the disclosure.

FIG. 7 depicts an antenna azimuth tuning case, comparing before tuning 700A and after tuning 700B. The dots represent the geo-data sample locations. In the before tuning 700A representation, the azimuth 710A of cell_2 704A may not be pointing to the center of the data samples. After tuning the azimuth 710A of cell_2 704A, the data samples corresponding to cell_2 704A may have higher antenna gains (e.g., possibly better RSRP and/or RSRQ). Some samples at the edge of cells 702A, 704A may change cells for better performance after tuning.

In some embodiments, predictions (e.g., determined by computing system 90) of post-tuning network performances may be generated by joining the predictions of one or more tuning parameters (e.g., azimuth, tilt, transmit power) to lower layer metrics (e.g., RSRP and RSRQ) improvement and/or the predictions of tuning lower layer metrics to upper layer metrics (e.g., speed and latency) improvement.

First, the recommended parameters (e.g., determined by computing system 90) may be based on the data samples. The recommendation may be determining the new azimuth 712 such that the new azimuth 712 is pointing to a majority of the data samples (e.g., the cell center). The data samples may represent locations of user devices (e.g., computer systems 30). Tuning the azimuth toward the recommended direction may enable better RSRP and RSRQ distributions and higher spectrum efficiency associated with antennas (e.g., antennas 706A and 706B) of the cells. The antennas 706A and 706B may also be referred to herein as base stations 706A and 706B or base transceiver stations 706A and 706B. Tuning the parameters (e.g., of a cell's antenna) may improve the distribution of RSRP and RSRQ. The predicted metrics (e.g., RSRP and RSRQ) may be determined (e.g., by the computing system 90) based on the models, such as an antenna model.

For example, an estimation may be used (e.g., by the computing system 90) to predict post-tuning RSRP and RSRQ. A horizontal antenna gain at azimuth φ may be determined/estimated by:

$$A_H(\varphi) = -\min\left[12\left(\frac{\varphi}{\varphi_{3dB}}\right)^2, A_m\right],$$

where $\varphi_{3\,dB}$ is the 3 dB beamwidth (e.g., 70 degrees, 65 degrees, etc.), $A_m$ is a threshold of antenna gain (e.g., 25 dB), and these parameters may be based on the antenna types. The RSRP or RSRP improvement may be determined by:

$$\min\left[12*\left(\frac{\varphi_{tuning}}{\varphi_{3dB}}\right)^2, A_m\right],$$

where $\varphi_{tuning}$ is the tuning angle (e.g., the difference of the angle of the determined/recommended azimuth and the current azimuth). Presume the boresight ($\varphi=0$ degrees) is pointing to the angle of the determined/recommended azimuth (e.g., toward the center of the cell for example where a majority of user devices may be located) and the current azimuth is pointing to $\varphi=\varphi_{tuning}$ degrees, relative to the assumed boresight. Also assume that $$\left(\frac{\varphi_{tuning}}{\varphi_{3dB}}\right)^2$$

is not larger than $A_m$ as in the formula. Then, the gain is roughly/approximately:

$$-12*\left(\frac{0}{\varphi_{3dB}}\right)^2 - \left[-12*\left(\frac{\varphi_{tuning}}{\varphi_{3dB}}\right)^2\right] = 12*\left(\frac{\varphi_{tuning}}{\varphi_{3dB}}\right)^2.$$

Second, the improved RSRP or RSRQ may be translated (e.g., by computing system 90) to predicted upper layer metrics improvement via the generated models, such as those illustrated in FIGS. 3A, 3B, 3C, and 3D.

Third, the predicted post-tuning network performance may be determined by the computing system 90. For example, in the first step, tuning the azimuth by 30 degrees may increase antenna gain by min $$\left[12*\left(\frac{30}{70}\right)^2, 25\right] = 2.2. \; RSRP$$

may also be increased by this amount due to the increased antenna gain. According to the slope shown in FIGS. 3A, 3B, 3C, and 3D, the predicted download speed increase is estimated/determined by the computing system 90 (e.g., by 2.2*131.4 kbps (the slope)=289 kbps), and the predicted latency improvement is estimated/determined by the computing system 90 (e.g., by 2.2*8.4 ms (the slope)=18.5 ms) such that RTT may be estimated to decrease by 18.5 ms).

In some embodiments, maintaining accurate system parameters may be automated. For example, inaccurate site locations (e.g., a manual mistake by engineers who may record the site location parameters to a spreadsheet of the system parameters) may be detected (e.g., by computing system 90) via computed/determined distance of the site to a cell center being too large. In an instance in which an inaccurate site location is detected, a notification may be generated (e.g., by computing system 90). The event of the computed/determined distance of the site location to a cell center location being too large may be indicated by the distance being greater than a threshold or jointly with other conditions (e.g., the radius of the cell is greater than a predetermined threshold). For example, if the distance from site to cell center is larger than 1.5 times (or other multiple (e.g., 2 times, or 3 times, etc.)) of the cell radius. On a site, in an instance in which there are multiple cells (e.g., 3 cells) and the computing system 90 detects this event for all cells, then it may be a stronger indication that the site location is inaccurate than an instance in which the computing system 90 detects this event for only one cell of the site.

In some embodiments, maintaining accurate system parameters may be automated (e.g., by computing system 90). For example, inaccurate azimuth parameters (e.g., swapped or rotated hardware, mismatching cell identifiers) may be identified (e.g., by the computing system 90) via patterns of computed/determined azimuth tuning degrees. In an example, the relationship of the estimated azimuth tuning degree as compared to the cell identifier or cell local identifier may indicate that the azimuth parameters on record may have been swapped or rotated.

In Table 1A below, for the same site identifier xx1, there are three cells. Cell_0 and cell_2 are recommended (e.g., by computing system 90) to be azimuth tuned 95 degrees clockwise and 91 degrees counterclockwise, respectively. As these two tuning degrees are of a similar amount of degree but in opposite directions, the cell ID is mismatching the azimuth on record, indicating that this may be a situation in which the actual hardware (e.g., antennas (e.g., antennas 706A, 706 B)) on these two cells may have been swapped (e.g., during installation). In an instance in which the hardware has been swapped, rather than reinstalling the hardware to correct the swap, the record of parameters may be corrected. For example, the hardware with cell ID 0 may be recorded (e.g., by computing system 90) as pointing to 170 degrees and the hardware with cell ID 2 may be recorded as pointing to 70 degrees. However, if the hardware is not similar for cell ID 0 and cell ID 2, the personnel (e.g., engineers) associated with the cell(s) may need to reinstall the hardware (e.g., swap the hardware).

TABLE 1A

| An example of detection of cells to be swapped | | | | | | | |
|---|---|---|---|---|---|---|---|
| Site ID | Cell ID | Azimuth on record | Computed azimuth using data | Tuning degree | Cell ID mismatching | Corrected cell ID | Tuning degree based on corrected cell ID |
| xx1 | 0 | 70 | 165 | 95 | Y | 2 | −5 |
| xx1 | 1 | 250 | 227 | −23 | N | 1 | −23 |
| xx1 | 2 | 170 | 79 | −91 | Y | 0 | 9 |

TABLE 1B

An example of detection of cells to be cycled

| Site ID | Cell ID | Azimuth on record | Computed azimuth using data | Tuning degree | Cell ID mismatching | Corrected cell ID | Tuning degree based on corrected cell ID |
|---|---|---|---|---|---|---|---|
| xx2 | 0 | 10 | 251 | 241 | Y | 2 | 21 |
| xx2 | 1 | 120 | 5 | −115 | Y | 0 | −5 |
| xx2 | 2 | 230 | 147 | −93 | Y | 1 | 27 |

In Table 1B above, for the same site identifier xx2, there are three cells. Cell_0, cell_1, and cell_2 are recommended to be azimuth tuned 241 degrees clockwise, 115 degrees counterclockwise, and 93 degrees counterclockwise, respectively. The tuning degrees may indicate that the cells may need to be cycled (e.g., each cell shifted to one or more next cells). The determined azimuth degrees (e.g., 251, 5, 147 degrees) (based on the geotagged data samples) may be more like the azimuth on record (e.g., 10, 120, 230 degrees) in an instance in which the cells are cycled to change the position (or order) of the cells. For example, cycling the cells may yield degrees (e.g., 5, 147, 251 degrees), which may be much closer to degrees (e.g., 10, 120, 230 degrees) on record. This indicates the cell IDs may be in conflict with the parameter configuration of the azimuth and that this may be a situation where the hardware (e.g., antennas) corresponding to these cells may have been improperly cycled.

For example, during cell installation, the personnel (e.g., engineers) associated with a cell(s) may have been requested to install cell_0 hardware (e.g., an antenna) to 10 degrees (e.g., azimuth angle of an antenna). However, the determined azimuth (e.g., by the computing system 90) using data may indicate that the cell_0 hardware was actually installed toward the direction of 230 degrees, which is the azimuth on record for cell_2. After installation, the mistaken cycling may have resulted in cell_1 having azimuth 120 degrees actually installed at 10 degrees (e.g., the azimuth on record for cell ID 0) and cell_2 having azimuth 230 degrees actually installed at 120 degrees (e.g., the azimuth on record for cell ID 1). To correct this issue, the computing system 90 may recommend corrected cell IDs. Based on the corrected cell IDs, the recommended tuning degree may also be determined and provided by the computing system 90, such as in the last column of Table 1B. In an instance in which the recommended tuning degree of a cell based on the corrected cell IDs is still large (e.g., greater than 20 degrees, as with cell_0 and cell_2), it may be likely that the azimuth is not pointing to the center of the cell and that tuning the azimuth may be likely to optimize the cell performance.

In some embodiments, the computing system 90 computes a least a recommended azimuth angle for a cell (e.g., antenna of a cell) and a recommended azimuth tuning angle for the cell (or antenna of a cell). The recommended azimuth angle is an angle corresponding to a direction from the location of a site associated with the cell pointing to a center of the cell's coverage area (also referred to as the center of the cell). The center of the cell can be determined by a center of the geotagged data samples (e.g., latitude and longitude) associated with the cell. The recommended azimuth tuning angle may be a difference of a current azimuth angle and the recommended azimuth angle. The computing system 90 may also identify a mismatch of cell identifiers by determining whether there are at least two cells whose recommended azimuth angle is closer to another cell's current azimuth angle than its own current azimuth angle. The computing system 90 may also identify a matched current azimuth angle for each cell with the mismatching cell identifier and recommend a change of the cell identifier associated with the current azimuth angle to be associated with a cell associated with the matched current azimuth angle. The computing system 90 may also determine the recommended azimuth tuning angle by determining the difference of the matched current azimuth angle and the recommended azimuth angle of the cell. In the optimization tool 011, an optimization tool user 014 may select a cell to apply an azimuth tuning (e.g., to correct cell mismatch) based on a recommended azimuth tuning angle being greater than a predefined threshold.

In some embodiments, the vertical tilt and/or transmit power of a cell's antenna may be predicted/determined by computing system 90 to be tuned via the detection of the tuning opportunities. The tuning opportunities may be detected by computing system 90 via the detection of overshooting, undershooting, cells with low radio signals, or cells with low metrics (e.g., RSRP, RSRQ, SINR, etc.), and/or cells with high sensitivity. Tilt may include mechanical tilt and electrical tilt. An electric tile may be adjusted via software control, and the mechanical tilt may be adjusted manually or via an automated motor. In an example embodiment, an electric tilt and/or mechanical tilt may be invoked in response to a command(s) generated by computing system 90. In an instance in which tilt and/or transmit power are adjusted, the coverage of the cell and/or antenna gain may change. Accordingly, the metrics (e.g., lower layer and upper layer) may also change. For example, a tilt close to vertical may result in covering only a small area for that cell, possibly higher antenna gains, and possibly higher metrics (e.g., signal strength, signal quality, SINR, and the like). But if the cell's antenna is tilted close to horizontal, then coverage may be broader. For example, a larger transmit power may result in a larger coverage area of a cell, and possibly higher metrics (e.g., signal strength, signal quality, SINR, and the like).

Figure 8:
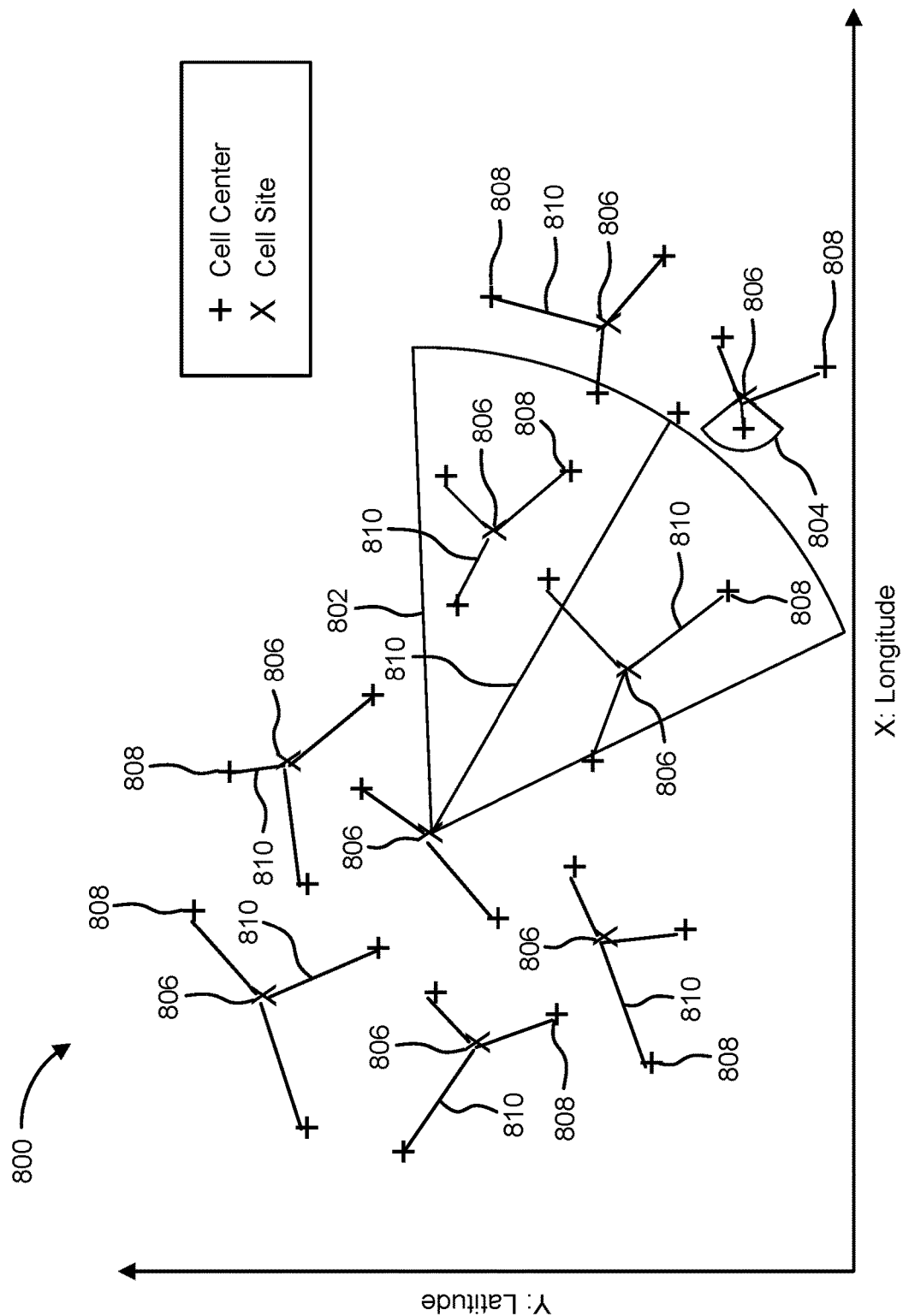
FIG. 8 illustrates optimization opportunities for RF tuning utilizing topology information and the distance of the site location, to the cell center, computed via geotagged data samples, according to an aspect of the disclosure.

FIG. 8 depicts an example environment 800 having overshooting and undershooting. Overshooting may mean that a cell's coverage reaches too far, which allows more opportunities for antenna tilting down and/or transmit power decrease. Undershooting may mean a cell's coverage does not reach far enough, which allows more opportunities for antenna tilting up and/or transmit power increase. An overshooting cell 808 may interfere with other sites 806 far from the cell's location. In FIG. 8, a site 806 location and the cells 808 associated with this site 806 are plotted. A line 810 is drawn from a site 806 location to the center of a cell 808 of this site 806. The center of a cell 808 is determined by computing system 90 via the data samples having location information associated with the cell 808. The visualization may also show an underlying map, as well as the metrics distributions (e.g., as shown in FIG. 5 and FIG. 6).

In some embodiments, an overshooting cell 808 or an undershooting cell 808 is detected by using the distance of a site 806 location to the center of the cell 808. The center of the cell 808 is derived via geotagged data samples associated with the cell 808. For example, if the distance of a site 806 location to the center of the cell 808 is greater than a certain threshold, then it may be overshooting. If the distance of a site 806 location to the center of the cell 808 is less than a certain threshold, then it may be undershooting.

FIG. 8 also shows an example environment 800 utilizing coverage geometry to detect overshooting and undershooting. The cell 808 may have a coverage area 802, and a coverage area 804 that may be represented by a geometry of a certain shape, such as a circle, triangle, rectangle, or the like. The geometry of the coverage areas 802, 804 may be determined (e.g., by the computing system 90) by geotagged data samples associated with the cell 808. For instance, a cell 808 may be tuned to certain degrees, such as for example 60, 90, or 120 degrees, where the degree(s) may be fixed or related to beamwidth of the antennas (e.g., antennas 706A, 706B). The cell 808 may have a center line 810 between the site 806 location and the cell 808 center, presuming the azimuth is properly tuned. Determining the center line 810 (e.g., by computing system 90) may also help determine the geometry of the coverage areas 802, 804. Within the determined geometry of a coverage area 802, a coverage area 804, in an instance in which the number of cells 808 or sites 806 is greater than a predetermined threshold, then the cell 808 may be overshooting. Similarly, in an instance in which the number of cells 808 or sites 806 is less than a predetermined threshold, then the cell 808 may be undershooting.

In some embodiments, statistical information about the sites 806 and/or cells 808 within a coverage area 802, 804 may also be used (e.g., by the computing system 90) to detect whether the cell 808 is overshooting or undershooting. For example, the count of sites 806 and/or cells 808 within a coverage area 802, a coverage area 804 of a cell 808 may be used to detect overshooting or undershooting. The size of the coverage areas 802, 804 may be adapted if overshooting or undershooting is detected (e.g., by computing system 90). For example, the length of the geometry of the coverage areas 802, 804 may be modified while keeping the azimuth angle such that the length of the coverage areas 802, 804 is within a multiple of the distance between the site 806 and cell 808 center.

Within a coverage area 802, a coverage area 804, the number of neighboring sites 806 or cells 808 may be counted, for example by computing system 90. A number of neighboring sites 806 or cells 808 (e.g., sites 806 or cells 808 within a predetermined distance) greater than a predetermined threshold in the coverage area 802, coverage area 804 may indicate overshooting; number of neighboring sites 806 or cells 808 less than a predetermined threshold in the coverage areas 802, 804 may indicate undershooting. Similarly, within a coverage areas 802, 804, a count of sites 806 or cells 808 greater than a predetermined threshold may indicate overshooting, and a count of sites 806 or cells 808 less than a predetermined threshold may indicate undershooting. The predetermined threshold for determining overshooting and undershooting may be different or the same. The predetermined thresholds may be based on how the geometry of the coverage areas 802, 804 is defined. For example, the predetermined threshold may be proportional to the size of the geometry of the coverage areas 802, 804. For instance, a larger multiplier may result in overshooting, and a smaller multiplier may result in undershooting.

In some embodiments, overshooting and undershooting may also be determined based on metrics for measuring the distance of neighboring sites 806 or cells 808 to a cell's geometry or center. For example, in an instance in which the distance of a site 806 location to a cell 808 center is greater than an overshooting multiplier (e.g., u=1, 1.5, 2, etc. where u>1) multiplied by the average distance of a site 806 to the center of neighboring cells 808 within the coverage area 802, 804 geometry, then this cell 808 may be overshooting. As another example, in an instance in which the distance of a site 806 location to the cell 808 center is greater than an undershooting multiplier (e.g., v=0.3, 0.5, 0.8, etc. where v<1) multiplied by the average distance of a site 806 to the center of neighboring cells 808 within the geometry, then this cell 808 may be undershooting. In some examples, the multiplier(s) may be determined via a machine learning model(s) trained on data labeled as overshooting or undershooting, heuristics, and/or manual configuration.

In some embodiments, the tilt and/or transmit power tuning may be determined, by computing system 90, based on the RSRP and/or RSRQ distribution, distance from the site 806 to the center of cell 808, and/or cell range based on the location information of the geotagged data samples (e.g., logged/obtained from an app) jointly with neighboring cells 808.

In some embodiments, an iterative process may be used to optimize a network. For each iteration, one or more cells 808 with worst RSRP and/or RSRQ, longest distance from site 806 to the center of the cell 808, and/or another attribute may be chosen (e.g., by the computing system 90) to be optimized. The sensitivity may be determined, by computing system 90, via the relationship of the upper layer metrics (e.g., download speed, latency, etc. logged by an app) and the lower layer metrics (e.g., RSRP and/or RSRQ).

In some embodiments, a bad cell 808 may be selected, by computing system 90, for optimizing based on the RSRP, RSRQ, and/or a distance to another cell 808 (e.g., too far and possibly overshooting). For example, RSRP and/or RSRQ tuning knobs (e.g., for regulating sensitivities to metrics such as download speed, RTT, latency, etc.) may be used to select cells 808 with higher sensitivity of upper layer metrics. For the selected cells 808, a zoom in function may be executed, by computing system 90, and/or the tuning may be performed based on the data samples.

In some embodiments, an antenna tilt may be decreased such that lower layer metrics (e.g., RSRP, RSRQ) increases. The post-tuning lower layer metrics and/or upper lawyer metrics may be estimated, by computing system 90, based on location information associated with data samples. The neighboring cells 808 may be jointly tuned, for example by computing system 90. In other words, the computing system 90 may facilitate joint tuning of the antennas of the neighboring cells 808.

In some embodiments, undershooting may be addressed by selecting, by computing system 90, the undershooting cells 808 based on RSRP, RSRQ, a short distance to cell 808 center, and/or another attribute. RSRP and/or RSRQ tuning knobs (e.g., for regulating sensitivities to metrics, such as download speed, RTT, latency) may be used to further select cells 808 with higher sensitivity of upper layer metrics. For the selected cells 808, a zoom in function may be executed, by computing system 90, and/or the tuning performed based on the data samples. For example, a transmit power may be increased and/or the antenna (e.g., antenna 706A, 706B) tilted up. Post-tuning metrics may be estimated, for example, by computing system 90. Neighboring cells 808 may be a factor in the optimization so as not to add too much interference.

In some implementations, an overshooting cell 808 may be determined, by computing system 90, and an optimization to tilt down or reduce transmit power associated with an antenna (e.g., antenna 706A, 706B) may be recommended. For example, a distance (e.g., greater than a threshold, among the largest 5% within a region, etc.) from a site 806 to a cell 808 center may be large. The distance may be a range such as a distance from the site 806 to cell 808 center plus a radius. In yet another example, a rectangle may have a diagonal vertex that is the site 806 location and the center of the cell 808 (or the furthest edge point of the cell) may have another cell's center inside. In other implementations, the opposite may be determined (e.g., by the computing system 90), resulting in an antenna tilt up or transmit power increase at the antenna (e.g., antenna 706A, antenna 706B). Data samples may have location information for determining the cell 808 center and/or radius, such that the cell 808 topology and overshooting may be determined, for example by computing system 90.

Figure 9:
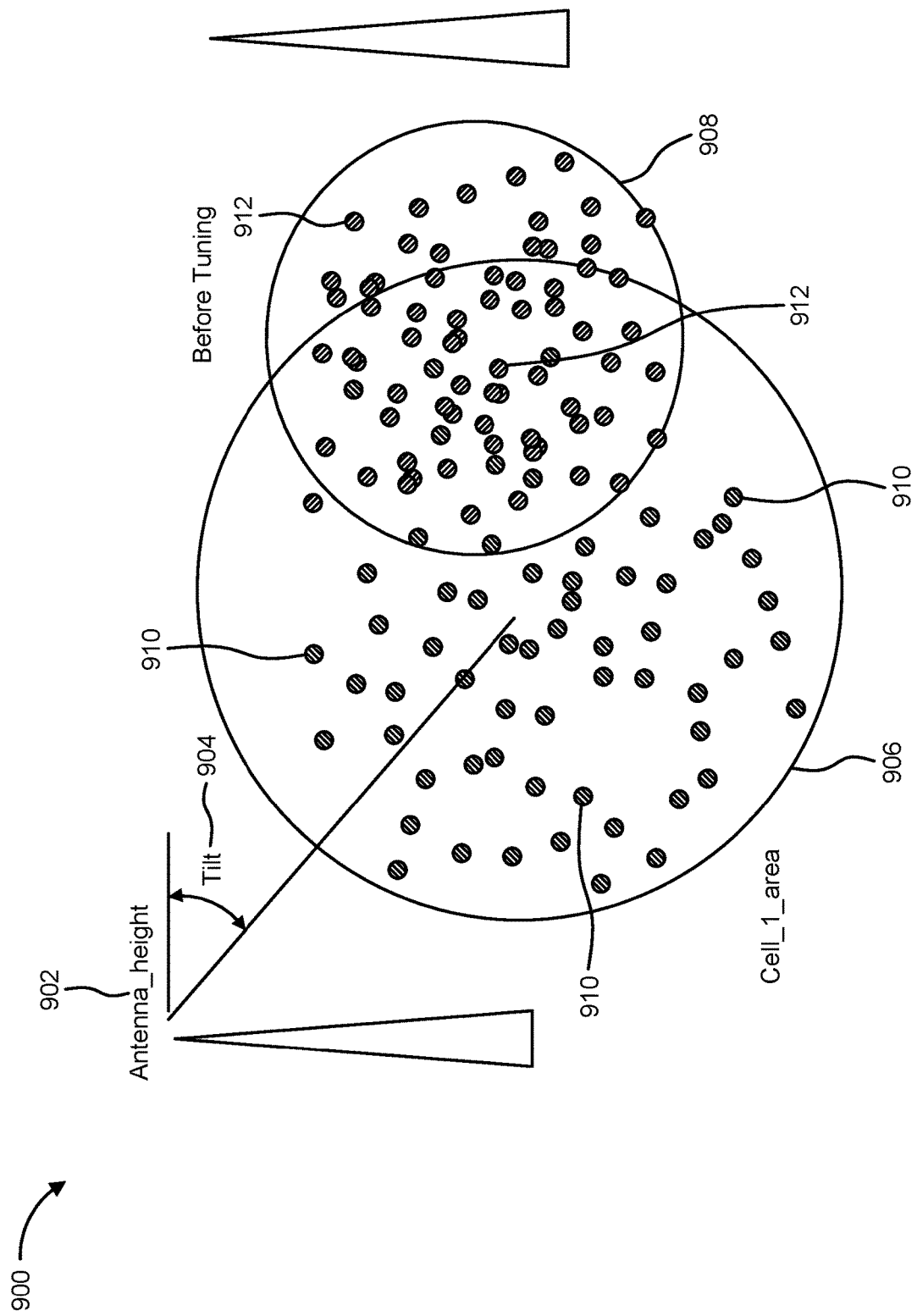
FIG. 9 and FIG. 10 illustrate an estimation or prediction involving hypothetical post-tilt tunings, according to an aspect of the disclosure.
Figure 10:
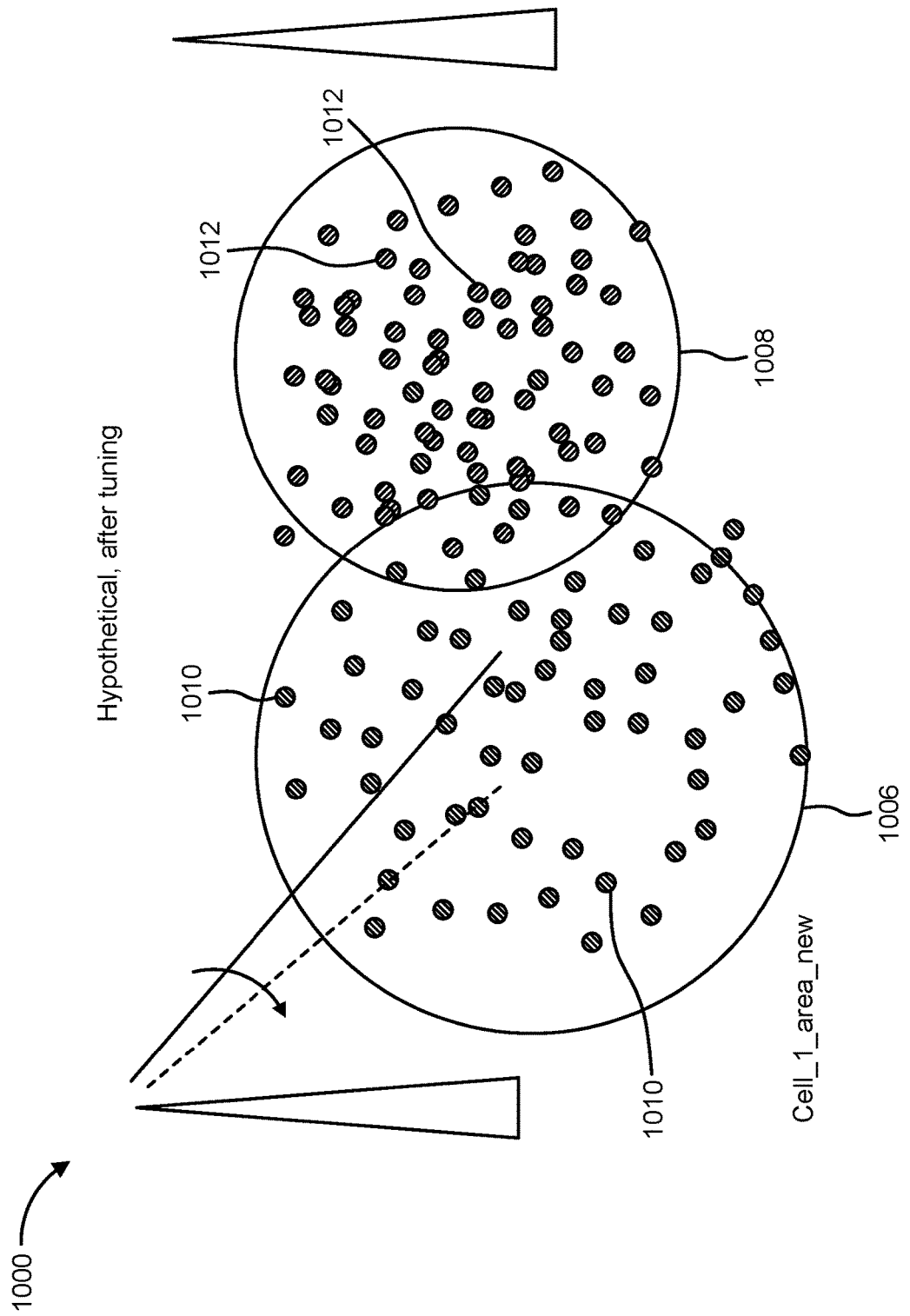

FIG. 9 and FIG. 10 illustrate an example of tilt tuning. FIG. 9 shows an example pre-tuning environment 900. The coverage of cell_1 906 before the tuning may be estimated based on the location information of the data samples 910 associated with cell_1 906 and, optionally, data samples 912 associated with cell_2 908. Many data samples 910 are located inside the intersection of the coverage areas of cell_1 906 and cell_2 908, which may indicate that cell 1 906 should be tuned to tilt down its antenna.

FIG. 10 shows the example of tilt tuning of FIG. 9. FIG. 10 shows an example post-tuning environment 1000. The cell_1 1006 may tilt down its antenna based on data samples 1010 associated with cell_1 1006 and, optionally, data samples 1012 associated with cell_2 1008. The resulting estimated coverage area of cell_1 1006 is comparatively smaller than the pre-tuning coverage area of cell_1 906. After tuning, some of the data samples 1010 formerly associated with cell_1 1006 (e.g., in the intersection of the coverage areas of cell_1 1006 and cell_2 1008) may switch cell associations to be associated with the new coverage areas.

Figure 11:
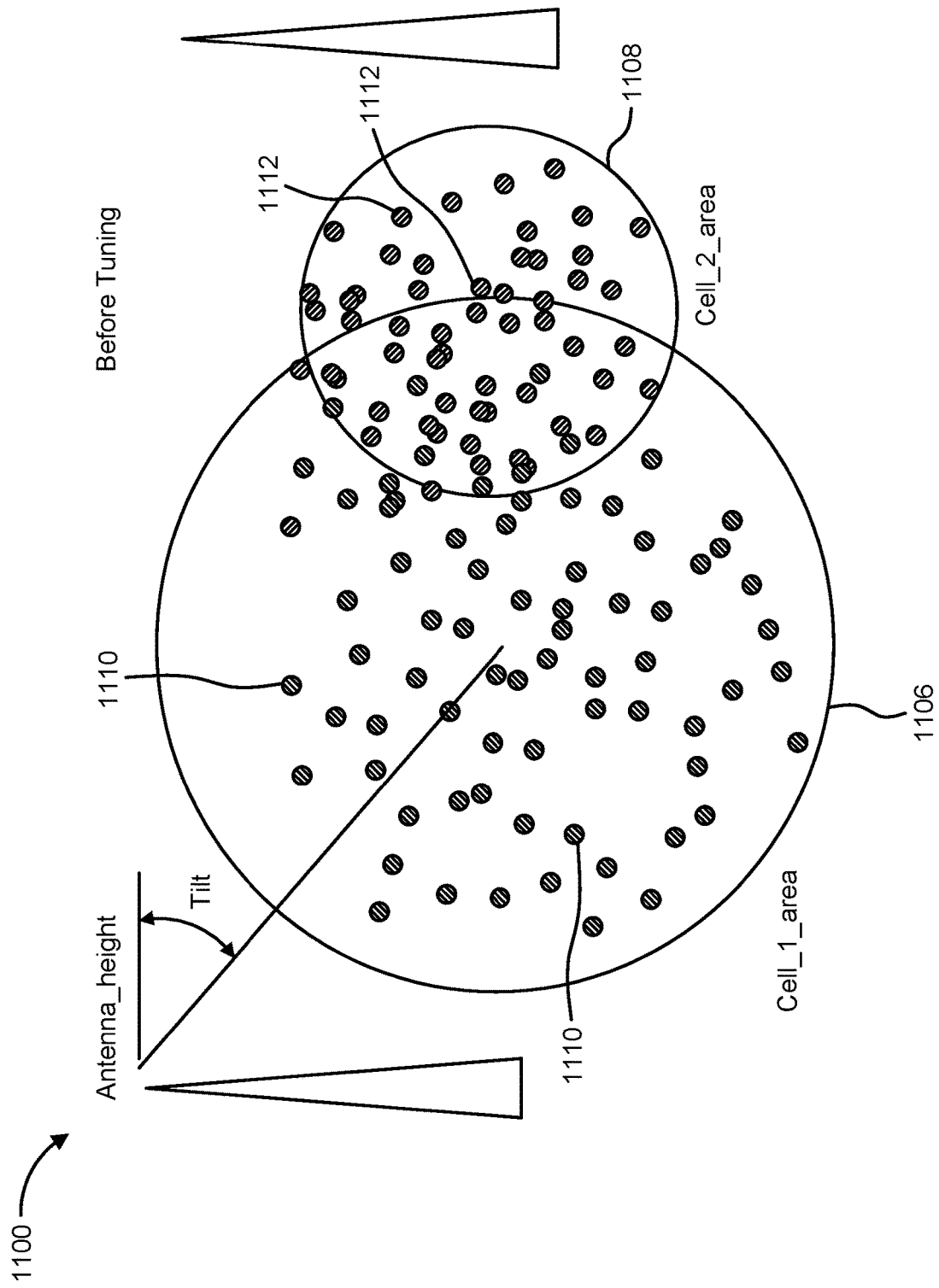
FIG. 11 and FIG. 12 illustrate joint optimization with neighboring cells, according to an aspect of the disclosure.
Figure 12:
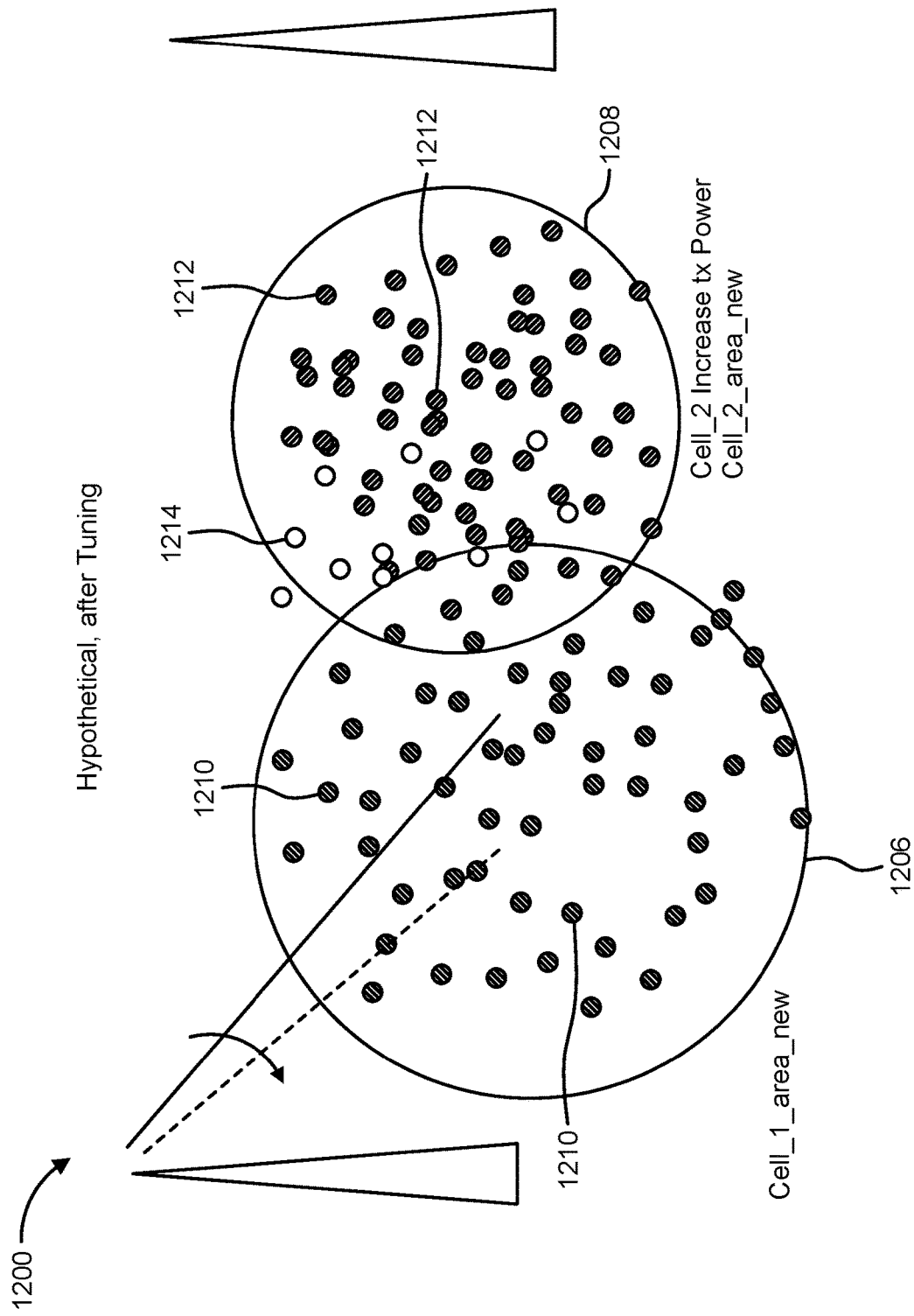

FIG. 11 and FIG. 12 illustrate an example of joint tuning. Cells 1106, 1108 may be jointly tuned by adjusting one or more attributes (e.g., by computing system 90) in cell_1 1106 while adjusting one or more attributes in cell_2 1108. In FIG. 11 and FIG. 12, cell_1 1106 is tuning tilt of an antenna while cell_2 1108 is tuning transmit power of an antenna.

FIG. 11 shows an example environment 1100 including the coverages of cell_1 1106 and cell_2 1108 before tuning, where the coverage of cell_1 1106 is too large and the coverage of cell_2 1108 is too small, as determined (e.g., by computing system 90) based on the location information of the data samples 1110 associated with cell_1 1106 and the data samples 1112 associated with cell_2 1108. Whether a cell is too large or too small may be based on the cell radius, proximity to other cells, amount of overlap with other cells, etc. The tuning for cell_1 1106 may be lowering the tilt of an antenna or reducing the transmit power of an antenna to reduce the cell coverage. The tuning for cell_2 1108 may be raising the tilt of an antenna or increasing the transmit power of an antenna to increase cell coverage area.

FIG. 12 shows an example environment 1200 including an estimated coverage area of cell 1 1206 and cell_2 1208 after tuning each cell. In an example, the estimated coverage area may be determined by computing system 90. Cell_1 1206 has a new, smaller coverage area. Cell_2 1208 has a new, larger coverage area. The estimated coverage may be based on the location information of sample data 1210 associated with cell_1 1206, sample data 1212 associated with cell_2 1208, and/or modeling of lower layer metrics, upper layer metrics, and/or cell attributes. After tuning, some of the data samples 1214 formerly associated with cell_1 1206 (e.g., in the intersection of the coverage areas of cell_1 1206 and cell_2 1208) may switch cell associations to be associated with the new coverage areas.

After tilt tuning, the reduced cell radius may be determined (e.g., by computing system 90) based on for example determining (geometry) of antenna height*[TAN(tilt_old)–TAN(tile_new)]. For example, the data samples for lower layer metrics (e.g., RSRP, RSRQ) in the old coverage area may be used to estimate the new lower layer metrics (e.g., median, 10th percentile, 5th percentile of RSRP, RSRQ). It may also be determined (e.g., by computing system 90) whether the tuning may generate a hole/gap (e.g., RSRP is too low for the shrunk area) in coverage and, if so, the tuning degree may be reduced.

In some embodiments, upon a cell lowering tilt of an antenna or reducing transmit power of an antenna, the coverage area may be analyzed to determine (e.g., by computing system 90) whether there are any holes in coverage (e.g., RSRP is too low for the shrunk area). If there are any holes, joint tuning may be performed, including determining the neighboring cell's tuning of antennas based on a current serving cell's tuning of an antenna. The current serving cell may be a cell (e.g., being evaluated by computing system 90) that may be providing service (e.g., cellular coverage) to user devices (e.g., computer systems 30) within a geographic area of the serving cell. For example, the neighboring cell's tuning may include raising the antenna tilt, increasing antenna transmit power, etc. In some embodiments, a linear additive may be added (e.g., by the computing system 90) to RSRP for tuning of transmit power (e.g., when transmit power increases 3 dBm, RSRP also increases 3 dBm), and RSRQ for post-tuning may be estimated as linear additive first then adjusted by taking into account a neighboring cell's transmit power change.

In some embodiments, a cell may be selected (e.g., by computing system 90) for optimizing based on the RSRP, RSRQ, and/or a distance to a cell (e.g., far distance indicating possible overshooting). For example, RSRP and/or RSRQ tuning knobs (e.g., sensitivities for metrics, such as download speed, RTT, downstream latency) may be used to further select (e.g., by computing system 90) those cells with higher sensitivity of upper layer metrics (e.g., download speed, latency). Non-sensitive cells (e.g., a cell having a small slope) may be also or instead be selected and the RSRP or RSRQ of the non-sensitive cells may be reduced without significantly affecting upper layer metrics (e.g., download speed). In this or another example, a cell with one or more upper layer metrics (e.g., download speed) above a threshold level may be selected because it may be feasible to reduce certain metrics (e.g., RSRP or RSRQ).

For the cells selected for tuning, a zoom in function may be executed, and the tuning may be performed based on the location information of the data samples. A transmit power of an antenna may be decreased, which may cause a decrease in lower layer metrics (e.g., RSRP and/or RSRQ). The post-tuning lower layer metrics may be estimated (e.g., by computing system 90) based on the location information of the data samples. The neighboring cells may also be tuned, by computing system 90, based on the tuning of the current serving cell antenna(s). For example, a first cell may by tuned such that its coverage area is decreased, and a second cell may be tuned such that its coverage area is increased to cover area formerly covered by the first cell. The tuning of the neighboring cells and the results of the neighboring cells tuning may be estimated by computing system 90.

In some embodiments, a cell may be selected, by computing system 90, for optimizing based on the RSRP, RSRQ, and/or a distance to a cell (e.g., far distance indicating possible overshooting). For the selected cell, a zoom in function and the tuning may be performed based on the location data of the data samples. A transmit power of an antenna may be decreased while tilt of an antenna may be raised. The post-tuning RSRP and/or RSRQ may be estimated, by computing system 90, based on the data samples. The neighboring cells may be jointly tuned (e.g., tuned based on the tuning of the current serving cell) by computing system 90. That is, the neighboring cells may be tuned to increase their coverage area to compensate for the reduced coverage area of the cell, and post-tuning RSRP, RSRQ may be estimated for example by computing system 90.

A network optimization tool user, such as for example personnel (e.g., an engineer(s) or other users) associated with an MNO, may be provided via a UI of a user device (e.g., computer system 30) in which the UI may indicate a view of maps and the antenna(s) (e.g., base stations 706A, 706B) associated with a cell. The site locations and/or current parameters of cells (e.g., azimuth, antenna tilt, transmit power, etc.) may also be provided by the computing system 90. These parameters may be annotated at or near the map, and the network optimization tool user may be provided an indication via the UI of a local area that is identified as the most in need of optimization. The user may then choose one or more areas to optimize. Once an area is selected via the UI by the user, the map may be zoomed in to identify all of the cell's performance attributes. A recommendation may be provided to the user, such as, for example, an azimuth or tilt adjustment. In this or another example, a prediction may also be provided to the UI by the computing system 90, such as an estimated performance improvement in an instance in which a provided recommendation is determined by the computing system 90. Such performance improvement predictions, determined by computing system 90, may relate to a particular cell or to an entire local area covering multiple cells. In these or other examples, after the user performs the recommendation, the network optimization tool may monitor (e.g., continuously or periodically) the performance, regarding how the performance is being affected, and/or determine whether more tuning is recommended. A time series of the monitored performances may be provided by the computing system 90 via the UI. The user may also use the monitoring functions to optimize other parameters than the radio signal related parameters, such as handover related parameters, load balancing parameters, etc.

The user may keep/store manually updated databases of the system parameters for example via a memory (e.g., non-removable memory 44) of a user device (e.g., computer system 30). In some embodiments, the database of system parameters may be continually updated by a network optimization tool in response to tuning activity performed. In some examples, the network optimization tool may be an app on a user device (e.g., computer system 30). The network optimization tool may be implemented by a processor (e.g., processor 32) of the user device. The network optimization tool may also track, in response to tuning activity, improvements associated with a connection(s), such as bandwidth, signal strength, and the user's experience of the content obtained thereof.

A region may be at a city, zip code, county, or province level. A site may include one or more cells (e.g., cell_1, cell_2, cell_3 etc., at a same frequency band). A local area may include multiple sites. A map (with x being longitude and y being latitude) may be divided into square tiles (e.g., 154 by 154 meters, 300 by 300 meters, 600 by 600 meters, etc.). Each tile may represent a region. For example, there may be 300 cells in a particular region. Regions may be user-defined, or network defined (e.g., by computing system 90), for a particular optimization project.

A scoring method may be implemented by the network optimization tool. The scoring method may be a function of variables including cell attributes and/or metrics. For example, a score may be a weighted sum of the RSRP and/or RSRQ or a weighted sum of the percentile of RSRP and/or RSRQ, where a lower score may reflect a region more in need of optimization. The scores may be weighted based on the number of data samples. The score may be used to choose which area to optimize. Additionally or alternatively, areas to be optimized may be selected by filtering. For example, filters may be applied, by the network optimization tool to identify areas/cells where RSRP or RSRQ may be among the lowest 10%, where overshooting or undershooting is detected (e.g., by the computing system 90) and where cells with distance (e.g., the distance between the cell site location and the computed/determined cell center) is among highest 10%, etc. The computing system 90 may provide determinations of the areas/cells where RSRP or RSRQ may be among the lowest 10% and where cells with distance being among the highest 10%, to the network optimization tool configured to be implemented via a user device (e.g., computer system 30).

Figure 13:
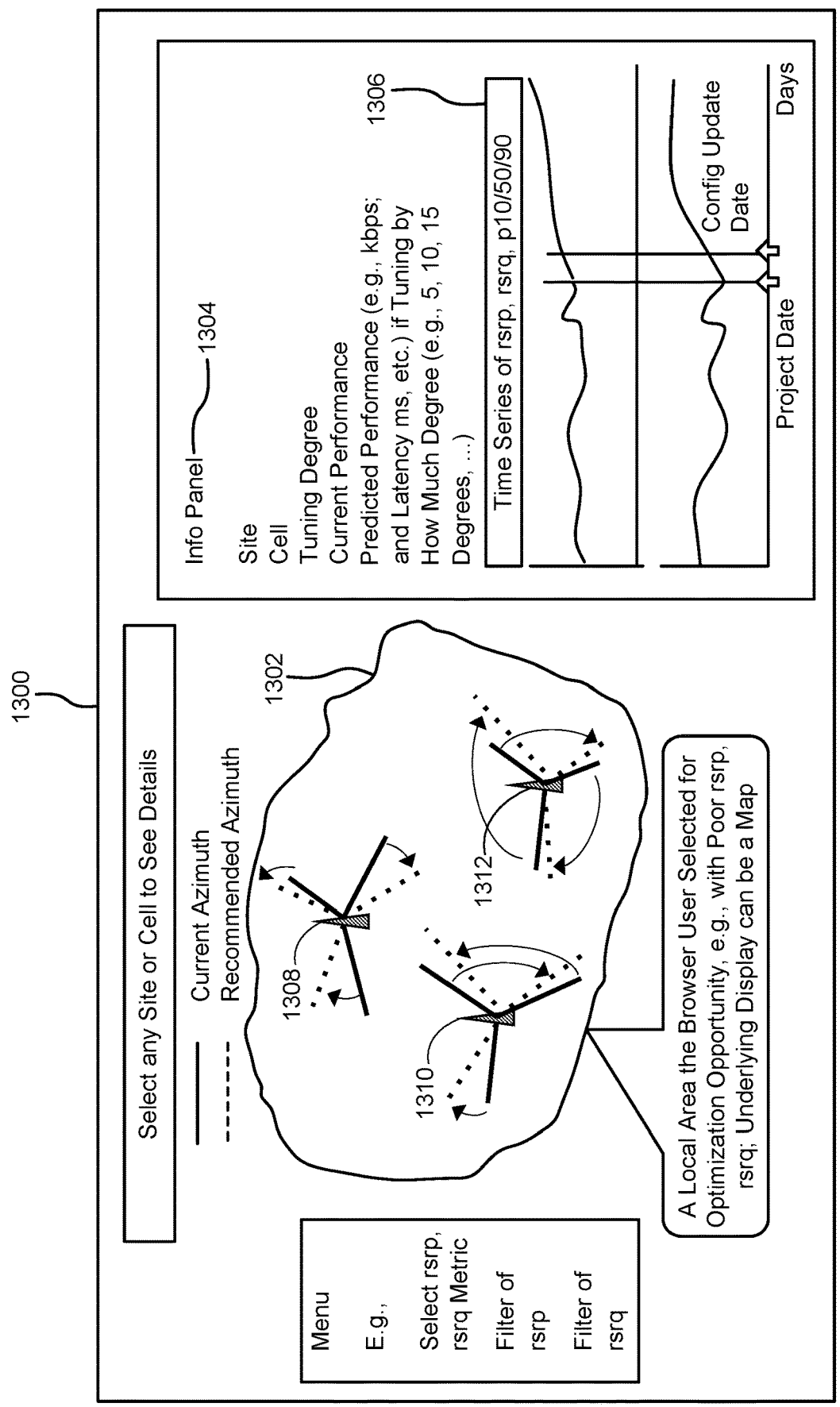
FIG. 13 illustrates an example of a user interface for displaying recommended tuning of azimuth, and monitoring display time series, according to an aspect of the disclosure.

FIG. 13 shows an example of the azimuth tuning use case shown on a UI 1300. A local area 1302 may be chosen by a user based on optimization opportunity prioritization, such as areas with cells having poor RSRP, poor RSRQ, high sensitivity of RSRP or RSRQ to upper layer metrics. A project may be created and saved for the optimization of the selected area 1302. The UI 1300 may show a map as visualization, as well as the metrics distributions, such as in FIG. 6 and FIG. 8.

The UI 1300 may display recommended azimuth tuning for site 1308 with the current azimuth, the recommended azimuth, and/or a tuning direction, such as an arrow starting from the current azimuth and ending toward the recommended azimuth. In the case of site 1308, each cell associated with the site 1308 on a frequency band may get one recommended azimuth tuning. In the case of site 1310, the UI 1300 may display cell swapping (e.g., the example of Table 1A). In the case of site 1312, the UI 1300 may display sector cycling (e.g., the example of Table 1B). The arrow starting from the current azimuth and ending toward the recommended azimuth, or some other similar indication or illustration, may be helpful to illustrate which azimuth is recommended to be tuned and in which direction.

The UI 1300 may display information 1304 (also referred to herein as info panel 1304) related to tuning recommendations and predictions based on the recommendations. The information 1304 may be presented in map view, table view, information panel, or any other form of UI. Besides the map, sites and cells may be chosen/selected (e.g., by a user) via data tables. A project may be created and saved for the optimization of the selected cells or sites. Monitoring may be provided, e.g., via time series 1306. The project creation date may be marked as well as the date of tuning an antenna(s) associated with a cell(s). The time series (e.g., time series 1306) may show the performance comparison before and after tuning. The time (e.g., dates) may be displayed on the time series to mark the timing of the configuration change or the timing of the tuning.

Figure 14:
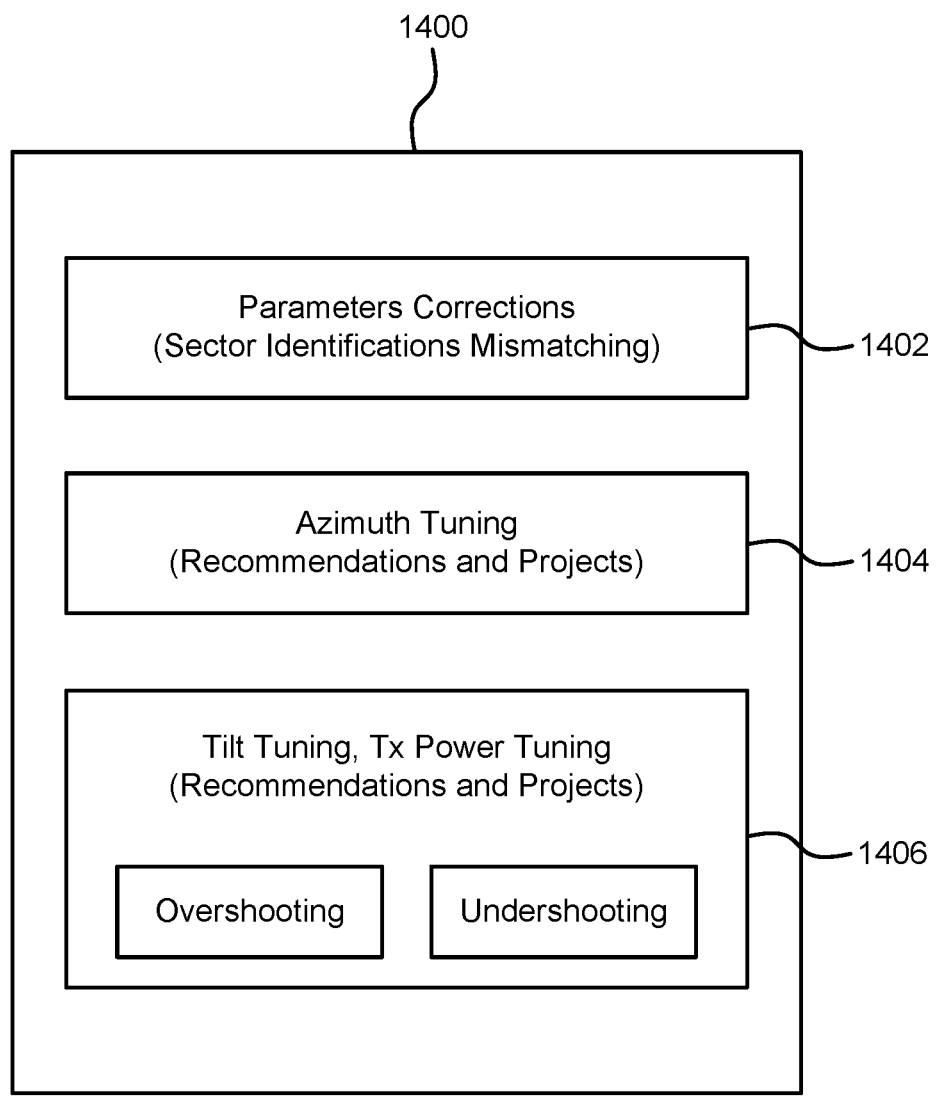
FIG. 14 illustrates an example of choosing optimization instances via a user interface, according to an aspect of the disclosure.

FIG. 14 shows an example of choosing optimization cases on a UI. A UI 1400 may be presenting optimization choices to a user device (e.g., computer system 30). In some examples, the optimization cases on UI 1400 may be provided by the computing system 90 to a user device. Parameter corrections 1402 may include, for example, cell identification mismatching, in an instance in which the cell identifications on record may not match the cells as located in the field (e.g., in a site). Mismatching may include, for example, cell swapping, cell cycling, and/or inaccuracies in cell site location records.

The tilt tuning and transmission (Tx) power tuning 1406 may include recommendations for tuning tilt and/or Tx power in scenarios of overshooting, undershooting, interference, and the like. Predicted performances may be provided for the tuning recommendations.

The example of Table 2 below shows four sites in a local area (e.g., about 12 cells). Table 2 may be associated with a map such as in FIG. 8 to display on a UI. The UI may also show a map as well as the metrics distributions, such as in FIGS. 5 and 6 and related descriptions. Table 2 shows an example of undershooting, where the table indicates a need to raise tilt associated with an antenna (and/or a need to increase the transmit power associated with an antenna), and an example of overshooting, where the table indicates a need to lower tilt associated with an antenna (and/or a need to decrease the transmit power associated with an antenna).

TABLE 2

An example of parameters tuning recommendations in a local area with neighboring cells

| Site index | cell_id | num_smpl | Kbps | RTT | ds_latency | RSRP | RSRQ | RSSNR | congestion | Recommended actions | Notes |
|---|---|---|---|---|---|---|---|---|---|---|---|
| 1 | 110 | 5135 | 7296 | 59 | 62 | −108 | −14 | −1 | 0.547 | Tx power up | |
| 1 | 120 | 4233 | 3614 | 102 | 89 | −107 | −16 | −1 | 0.437 | tilt down | download speed bad; RTT bad; RSRP bad, RSRQ bad, because RSRP and RSRQ are bad already, no room for Tx power down, hence tilt down, let UE associate to other neighboring cells on site 2, 3 |
| 1 | 130 | 616 | 7637 | 56 | 60 | −101 | −12 | −2 | 0.107 | | |
| 2 | 110 | 15447 | 6289 | 61 | 63 | −94 | −12 | 5 | 0.545 | | |
| 2 | 120 | 12615 | 4365 | 75 | 69 | −101 | −13 | 0 | 0.456 | | |
| 2 | 130 | 5007 | 10913 | 49 | 54 | −85 | −10 | 2 | 0.286 | tilt up | perf really good, tilting up, increase coverage area, RSRP; RSRQ already good, no need to increase Tx power; load may be increased |
| 3 | 110 | 1879 | 7308 | 52 | 57 | −97 | −10 | 6 | 0.507 | tilt up | perf good, RSRP RSRQ good. tilt up; check azimuth, tune clockwise so site #1 cell #2 samples may be associated to this cell. This check up of azimuth may be associated with azimuth tuning |
| 3 | 120 | 5153 | 3951 | 127 | 102 | −99 | −13 | 0 | 0.562 | Reduce RTT; reduce load | RTT too high; might be queued up; reduce load |
| 3 | 130 | 4863 | 5415 | 69 | 67 | −101 | −13 | 0 | 0.677 | | |
| 4 | 110 | 4248 | 4720 | 78 | 74 | −105 | −14 | 0 | 0.375 | Tx power up | Increase coverage RSRP |
| 4 | 120 | 632 | 9299 | 54 | 56 | −95 | −11 | 0 | 0.239 | | |
| 4 | 130 | 2669 | 7057 | 62 | 64 | −108 | −13 | 0 | 0.286 | Tx power up | Increase coverage RSRP |

The azimuth tuning 1404 may include recommendations for tuning of the azimuth angle, which may be done jointly with the correction of cell IDs. Azimuth tuning 1404 may also include recommendations for tuning the azimuth angles, which may be done prior to cell ID correction and may be based on the presumption that cell IDs are correct.

In the example in Table 2, these cells are on the same frequency band, per the consideration of inter-frequency band interferences among cells. In Table 2, Tx power may mean transmission power, cell_id may mean cell identifier, num_smpl may mean the number of samples associated with a cell within a certain time window, which may be a proxy to indicate the load of a cell; Kbps may mean download speed in kilobits per second at the upper layer (e.g., app layer); RTT may mean the round trip time in the unit of millisecond (ms) collected at the upper layer (e.g., a hypertext transfer protocol (HTTP) app and transport stack); ds_latency may be the downstream latency (e.g., the latency of RTT excluding the time traveled beyond the wireless network portion) including the time traveled between a device and wireless network backhaul and core networks before a server at a data center in the unit of ms; RSRP may be the reference signal received power; RSRQ may be reference signal received quality; RSSNR may be reference signal signal-to-interference-noise ratio (SINR); congestion may be an indicator of the end user perceived congestion, which is the degradation of upper layer measured download speed at busy hours versus download speed at non-busy hours (e.g., download speed at non-busy hours-download speed at busy hours)/download speed at non-busy hours).

In some embodiments, a tuning recommendation may be provided and a corresponding performance improvement may be predicted, for example by computing system 90. Either or both of the tuning recommendations and performance improvement may be presented via a UI (e.g., as depicted in FIG. 4 and/or as in additional columns in Table 2). As such, a real-world recommendation(s) or report(s) may be provided (e.g., via a UI) to a user device to enable a user to initiate the tuning.

In Table 2, each row may be a different cell. For some cells, no recommendation may be provided (e.g., due to a low sensitivity). Conversely, for other cells, the transmit power may be recommended to increase or decrease. This recommendation may be based on the effect on neighboring cells. The notes in the rightmost column of Table 2 show the reasoning used (e.g., in coordination with the other cells) in making an example recommendation. Since the user may not initiate adjustment of all 12 cells of a local area at once, a prioritized recommendation may also be provided.

In some embodiments, mechanisms and models may be built to detect tuning opportunities for cells with high potential for network performance improvement. The mechanisms and models may include various conditions and filters to detect such opportunities.

For example, the cells in the top 10th percentile of the distance between a cell center and site location may be good candidates for optimization. For these cells, additional conditions may be jointly applied, such as the ratio of the distance to the radius of the cell as compared to a threshold (e.g., 1.5, 2, 3, etc.). For these cells, if the cells are also among the bottom $10^{th}$ percentile of RSRP, the tuning may be lowering tilt of an antenna(s). If the cells are also among the top percentiles of RSRP and bottom percentiles of RSRQ, the tuning may be lowering tilt of an antenna(s) and facilitating interference mitigation. For the rest of the cells, the tuning may be lowering tilt of an antenna(s); if RSRQ is not in the bottom 10th percentile, and then decrease the Tx power of the antenna(s).

For another example, the cells with the bottom 10th percentile of RSRP may be good candidates for optimization. For these cells, if the cells are also among the top 10th percentile of distance, the tuning may be lowering tilt of an antenna(s). For all the other cells, the tuning may be increasing Tx power of an antenna(s).

The threshold of the 10th percentile is an example, and the threshold may be other predetermined values or dynamically set via machine learning models.

Additional conditions may be used. For example, if performance is optimal or sample count is low, these cells may not be candidates for optimization and may be filtered out.

For any tuning that includes lowering tilt or reducing Tx power of an antenna(s), neighboring cells may be considered so as not to generate a hole/gap in the overall coverage area between cells.

For cells with a large number of samples, the optimization opportunity may be load balancing. For cells with high RSRP and low RSRQ, the optimization opportunity may be interference mitigation.

Table 3 provides an example of a mechanism and modeling to facilitate the detection of opportunities for parameter tuning. This example provides certain combinations of conditions for selecting cells for optimization. These rules may be based on wireless domain knowledge and data analytics and modeling. In Table 3, p10, p50, p90 may reflect percentile values for 10th, 50th, 90th percentile, respectively. The distance may mean the distance between the site location and a determined cell center (e.g., based on the location information of the data samples). The determined cell center may be determined by the computing system 90. The radius is the determined cell radius (e.g., based on the location information of the data samples). The determined cell radius may be determined by the computing system 90. With the determined cell center and the determined cell radius, X-percent of the geotagged data samples associated with a corresponding cell may be covered, where X may be 95. As for the condition of distance/radius (e.g., distance/radius >2 as a predetermined threshold value; other exemplary predetermined threshold values may be 1.5, 3, etc.), this condition of distance/radius may be a potential condition for a possible inaccurate site location parameter, in which the latitude/longitude of the site location may be inaccurate. All the thresholds in Table 3 are exemplary, and the thresholds may be other exemplary values or thresholds set manually or dynamically (e.g., based on a machine learning model) by computing system 90.

TABLE 3

An example of a model for detecting tuning opportunities

| | RSRP < p10 | | RSRP > p50, | distance > p90 | | RSRP > p50 | distance > p90 |
|---|---|---|---|---|---|---|---|
| | | | | o.w. | | | |
| | Distance > p90 | o.w. | RSRP < p10 | RSRQ < p10 | RSRQ < p10 | RSRQ < p10 | distance/ radius > 3 |
| | | | | | | o.w. | | |
| Potential tuning | Tiltdown, Tx power | Tx power | Tiltdown, Tx power | Tiltdown; Tx power | Tiltdown, Tx power | Tiltdown; Tx power | Interference mitigation | Possible alert for inaccurate site |

TABLE 3-continued

An example of a model for detecting tuning opportunities

| distance > p90 | | | | | | RSRP > p50 | distance > p90 |
|---|---|---|---|---|---|---|---|
| RSRP < p10 | | RSRP > p50, | | o.w. | | | |
| Distance > p90 | o.w. | RSRP < p10 | RSRQ < p10 | RSRQ < p10 | o.w. | RSRQ < p10 | distance/radius > 3 |
| same | increase | same | same, interference mitigation | same | decrease | | location |

Table 4 provides an example of detecting opportunities for tuning, where the cells with top 10th percentile for distance or bottom 10th percentile for RSRP may be selected to be in this Table 4 as cells with tuning opportunities. The pool of the cells of this selection may be all the cells associated with a particular carrier_id (e.g., an identifier of a mobile operator) within a certain geographic region.

RSRQ may be reference signal received quality; RSSNR may be reference signal signal-to-interference-noise ratio (SINR).

For example, there may be N samples of metric RSRP values of a cell. These N samples of RSRP values may have a distribution, such as the 5th percentile value, 10th percentile value, 50th percentile value (median value), and 90th

TABLE 4

An example of parameter tuning recommendations for cells with high performance improvement potential

| cell_id | radius | distance | dominant_band | num_smpl | kbps | RTT | ds_latency | RSRP | RSRQ | RSSNR | potentials |
|---|---|---|---|---|---|---|---|---|---|---|---|
| x_1 | 1458.32 | 3707.07 | 3 | 2629 | 6628 | 84 | 87 | −104 | −11 | 1 | Tilt down, Tx power decrease |
| x_2 | 2396.33 | 2699.23 | 38 | 501 | 13472 | 75 | 78 | −101 | −8 | 0 | Tilt down, Tx power decrease |
| x_3 | 2912.20 | 2544.57 | 38 | 2831 | 13115 | 72 | 82 | −103 | −9 | 13 | Tilt down, Tx power decrease |
| x_4 | 3984.56 | 2470.97 | 3 | 3195 | 5467 | 98 | 98 | −110 | −11 | 0 | tilt down and Tx power keep the same |
| ?_5 | 1499.61 | 2362.40 | 3 | 28141 | 7271 | 89 | 89 | −102 | −13 | 0 | Tilt down, Interference mitigation & load balance to other cells (num of samples high) |
| x_6 | 805.98 | 2215.61 | 3 | 9357 | 10756 | 69 | 82 | −109 | −11 | 0 | tilt down and Tx power keep the same |
| x_7 | 1726.76 | 2160.88 | 3 | 889 | 8105 | 85 | 95 | −104 | −9 | 1 | Tilt down, Tx power decrease |
| x_8 | 2108.20 | 1766.87 | 38 | 59 | 19408 | 111 | 103 | −113 | −10 | | Tx power up |
| x_9 | 4644.33 | 1672.08 | 3 | 753 | 5060 | 139 | 141 | −112 | −10 | 0 | Tx power up |
| x_10 | 1654.10 | 1463.49 | 3 | 144 | 5092 | 107 | 108 | −110 | −9 | 2 | Tx power up |
| x_11 | 992.74 | 1349.25 | 3 | 647 | 4150 | 106 | 98 | −109 | −11 | 0 | Tx power up |
| x_12 | 1317.21 | 1410.67 | 3 | 653 | 7241 | 87 | 93 | −108 | −10 | | Tx power up |
| x_13 | 713.81 | 1371.85 | 3 | 5741 | 4542 | 109 | 112 | −108 | −11 | 4 | Tx power up |
| x_14 | 434.26 | 817.27 | 3 | 3867 | 5073 | 113 | 108 | −108 | −10 | 4 | Tx power up |

In Table 4, cell_id may mean cell identifier; radius may be a determined cell radius (e.g., in meters) based on the location data of data samples associated with a cell; distance may be the determined distance (e.g., in meters) between the site location and the cell center location; the dominant band may be the frequency band index of a cell; the num_smpl may be the number of samples associated with a cell within a certain time window (which may represent cell load); kbps may mean the upper layer (e.g., application layer) download speed in the unit of kilobits per second; RTT may be the round trip time (in milliseconds) collected at an upper layer (e.g., application and transport layer); ds_latency may be the downstream latency (in milliseconds), that is the latency of RTT excluding the time traveled beyond the wireless network portion (e.g., it includes the time traveled between a device and wireless network backhaul and core networks before a destination server/network device associated with a cell); RSRP may be the reference signal received power;

percentile value, where a lower RSRP value corresponds to a lower percentile. The 5th percentile value (denoted as RSRP_p5) is the value of RSRP where the probability of RSRP<RSRP_p5 is 0.05. The low percentile values (e.g., RSRP_p5 and/or RSRP_p10) may be an indicator of the worst RSRP performances of this cell.

If low percentile values of this cell may be improved, then the worst performance is improved. For example, for a particular cell, there are N data samples of RSRP and the RSRP distribution range from −120 dBm to −80 dBm, with the RSRP_p5 being −110 dBm, meaning there are 5% of the samples with RSRP lower than −110 dBm. Assume after tuning, RSRP now ranges from −110 dBm to −70 dBm, with RSRP_p5 being −100 dBm, meaning now there are 5% of the samples with RSRP below −100 dBm. The value of RSRP_p5 is improved by 10 dBm, comparing to before azimuth optimization. A successful tuning (e.g., antenna tuning) may be based on the RSRP and/or RSRQ distribution being improved, where the distribution may be indicated by the percentile value. For example, a successful tuning may be based on RSRP percentile value is improved. A successful tuning may also or instead be based on a decrease in the probability or percentage that RSRP or RSRQ is lower than a predefined threshold. For instance, a percentage of samples of RSRP<−110 dBm may be used to determine whether the tuning is effective. If the pre-tuning percentage of observed samples with RSRP<−110 dBm is 5% and the post-tuning percentage of observed samples with RSRP<−110 dBm becomes 0%, the tuning may be considered successful.

Figure 15:
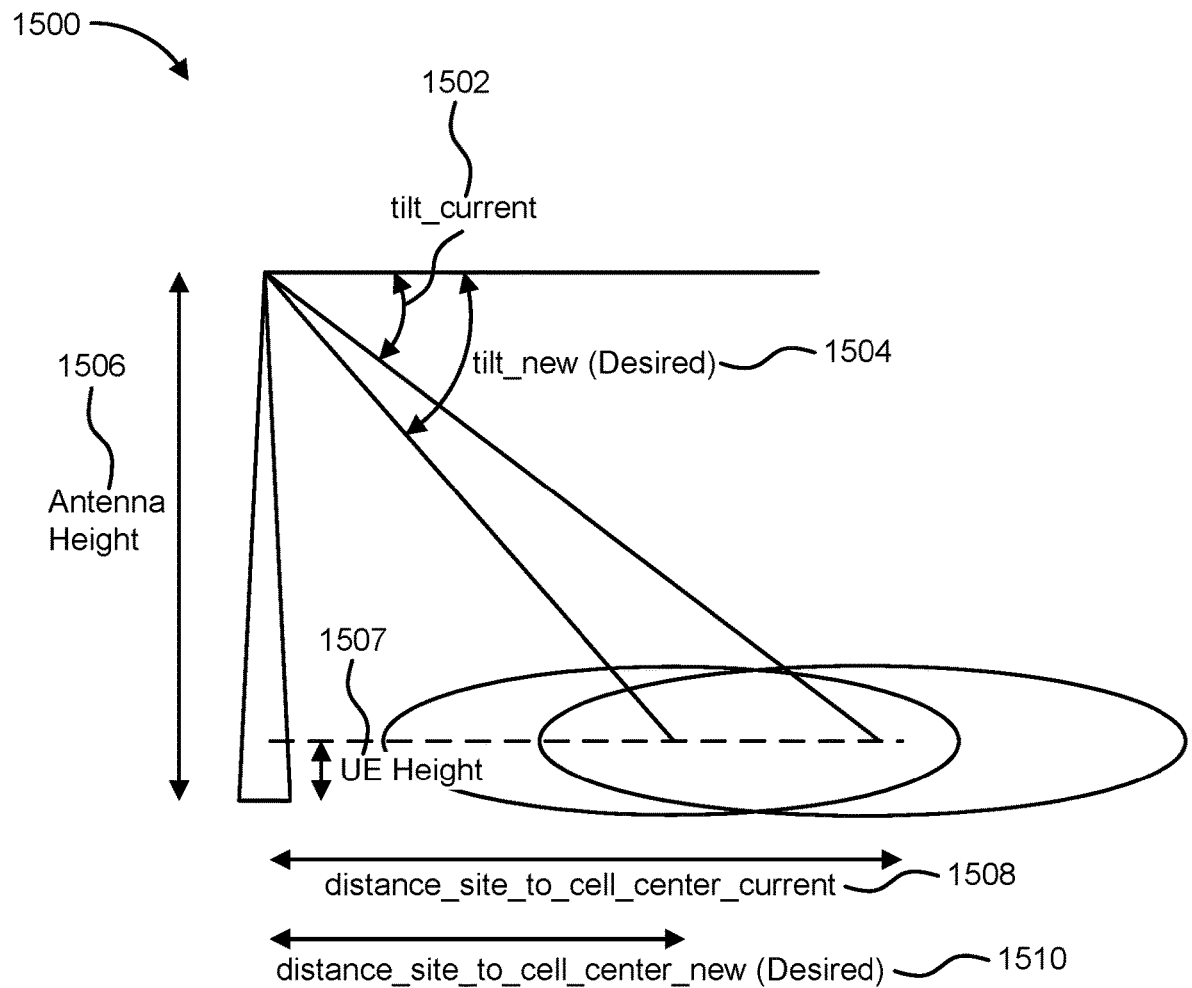
FIG. 15 illustrates an example of determining recommended tilt based on obtained data samples, according to an aspect of the disclosure.

FIG. 15 shows an example of a manner in which to determine recommended tilt using the data samples. The current tilt angle 1502 may be determined (e.g., by the computing system 90) by implementing the following formula:

$$\text{tilt\_current} = \arctan\left[\frac{(\text{antenna\_height} - \text{UE\_Height})}{\text{distance\_site\_to\_cell\_center\_current}}\right]$$

where arctan( ) is a function, antenna_height 1506 may be the height of an antenna, UE_Height 1507 may be the height of user equipment (e.g., computer system 30 (e.g., a cell phone, a user device, a mobile device, etc.), and distance_site_to_cell_center_current 1508 may be the distance between the site and the current center of a cell. The distance_site_to_cell_center_current 1508 may also be referred to herein as current cell center 1508, which may be a current serving cell.

A new center of the cell may be used by the computing system 90 to determine the new tilt angle 1504. The new tilt angle 1504 may be an angle from a cell site position at antenna height 1506 pointing to a new center 1510 of a cell, which may be determined by computing system 90 based on a new set of geotagged data samples associated with the cell (e.g., having current cell center 1508). The new set of geotagged data samples may be the data samples that are expected to be associated with the cell (e.g., having a current cell center 1508) at the new tilt angle 1504. For example, in an overshooting example, the data samples far away from the cell site may be excluded in the new set of data samples because these data samples far away (e.g., locations of user devices far away) may be better associated with a different cell. Similarly, in an undershooting example, the data samples close to the current cell coverage (having current cell center 1508), but not associated with this current cell, may be added to this cell's (e.g., having current cell center 1508) samples as part of the new set of data samples associated with this cell. The new tilt angle 1504 may be determined by the computing system 90 for example by implementing the following formula:

$$\text{tilt\_new} = \arctan\left[\frac{(\text{antenna\_height} - \text{UE\_height})}{\text{distance\_site\_to\_cell\_center\_new}}\right]$$

where distance_site_to_cell_center_new 1510 may be the distance between the cell site (e.g., having current cell center 1508) and the center of the new set of the cell's data samples.

Figure 16:
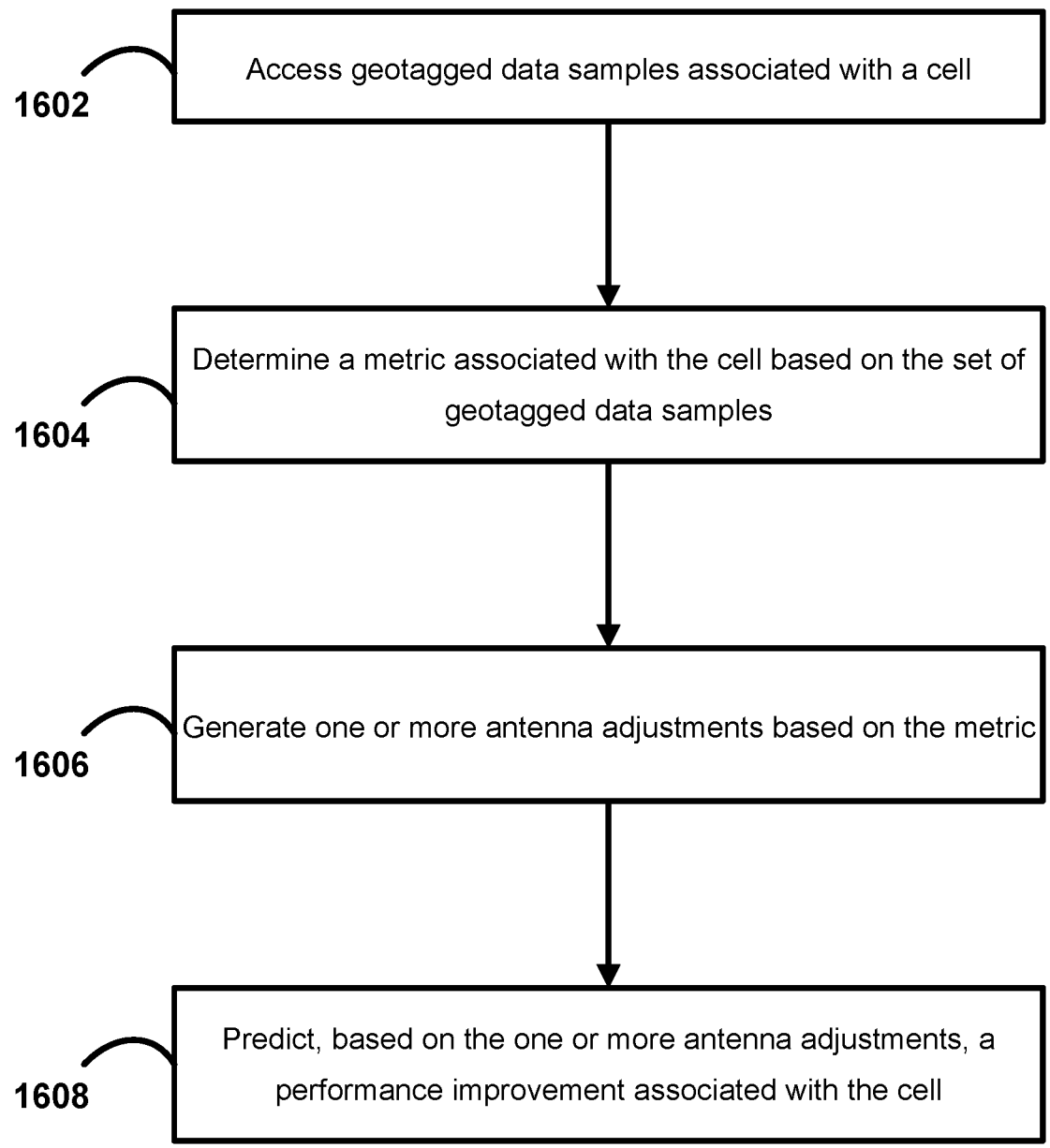
FIG. 16 illustrates an operation of an exemplary process in accordance with exemplary aspects of the present disclosure.

FIG. 16 illustrates an example flowchart illustrating operations for adjustments and recommendations associated with a cell(s) according to an exemplary embodiment. At operation 1602, a device (e.g., computing system 90) may access (e.g., receive, generate, retrieve, etc.) geotagged data samples (e.g., samples having longitude and latitude information of the UE corresponding to the sample) associated with a cell. At operation 1604, the device may determine a metric (e.g., upper layer metric, lower layer metric, etc.) associated with the cell. The cell may include at least one antenna (e.g., antenna 706A, antenna 706B). The metrics may be based on the geotagged data samples (e.g., the data samples periodically test for the metric at the corresponding UE). At operation 1606, the device may generate one or more antenna adjustments based on the metric. The one or more antenna adjustments may include a change to at least one of an azimuth angle, transmit power, or tilt of the antenna(s). At operation 1608, the device may predict, based on the one or more antenna adjustments, a performance improvement associated with the cell.

Techniques described herein may be implemented in digital electronic circuitry, or in computer hardware, firmware, software, or in combinations of them. The techniques may be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps of the techniques may be performed by one or more programmable processors executing a computer program to perform functions of the techniques by operating on input data and generating output. Method steps may also be performed by, and apparatus of the techniques may be implemented as special purpose logic circuitry, e.g., an FPGA or ASIC.

Processors suitable for the execution of a computer program include, by way of example, both general and special purpose microprocessors, and any at least one processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory may be supplemented by, or incorporated in special purpose logic circuitry.

While the system and method have been described in terms of what are presently considered to be specific embodiments, the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
    accessing a set of geotagged data samples associated with a cell, wherein the set of geotagged data samples are obtained from an application associated with one or more user equipment associated with the cell and the cell comprises at least one antenna;
    determining a metric associated with the cell based on the set of geotagged data samples;
    generating one or more antenna adjustments based on the metric; and
    predicting, based on the one or more antenna adjustments, a performance improvement associated with the cell, wherein the performance improvement comprises a cross-layer optimization represented by an upper layer metric improvement in response to a lower layer metric tuning.

2. The method of claim 1, wherein:
    the set of geotagged data samples comprises the metric corresponding to at least one of a download speed, latency, radio signal strength, or radio signal quality associated with a location from which the set of geotagged data samples are obtained.

3. The method of claim 1, further comprising:
    determining a second metric associated with a second cell based on a second set of geotagged data samples; and
    determining one or more second antenna adjustments based on the second metric.

4. The method of claim 3, further comprising:
    determining, for the cell, a sensitivity of an upper layer metric to a lower layer metric; generating a first score associated with the cell based on the sensitivity of the cell;
    determining, for the second cell, a second sensitivity of the upper layer metric to the lower layer metric; and
    generating a second score associated with the second cell based on the second sensitivity of the second cell.

5. The method of claim 4, further comprising:
    prioritizing, for the one or more antenna adjustments, the cell and the second cell based on the first score and the second score.

6. The method of claim 1, further comprising:
    recommending at least one of the one or more antenna adjustments in response to the performance improvement satisfying at least one predetermined criterion.

7. The method of claim 1, further comprising:
    determining at least one of an overshooting of the cell or an undershooting of the cell based on an overlap of a first coverage area of the cell with a second coverage area of a second cell, wherein the first coverage area and the second coverage area are determined based on the set of geotagged data samples.

8. The method of claim 1, wherein:
    the one or more antenna adjustments comprises a recommended tilt angle associated with the at least one antenna, wherein the recommended tilt angle is in relation to a position of a site associated with the cell.

9. The method of claim 1, wherein:
    the one or more antenna adjustments comprises at least one of a recommended azimuth angle associated with the at least one antenna or a recommended azimuth tuning angle associated with the at least one antenna;
    the recommended azimuth angle comprises an angle relative to a location of a site associated with the cell that points to a center of a coverage area; and
    the recommended azimuth tuning angle comprises a difference between a current azimuth angle and the recommended azimuth angle.

10. The method of claim 9, further comprising:
    determining a second recommended azimuth angle associated with a second cell; and
    determining whether a difference between the second recommended azimuth angle and the current azimuth angle of the cell is less than a difference between the recommended azimuth angle and the current azimuth angle associated with the cell.

11. The method of claim 10, further comprising:
    swapping a cell identifier associated with the cell and a second cell identifier associated with the second cell in response to the difference between the second recommended azimuth angle and the current azimuth angle associated with the cell being less than the difference between the recommended azimuth angle and the current azimuth angle associated with the cell.

12. The method of claim 10, further comprising:
    modifying the recommended azimuth tuning angle to a difference between the second recommended azimuth angle and the current azimuth angle.

13. The method of claim 10, further comprising:
    determining a second recommended azimuth tuning angle associated with the second cell; and
    prioritizing the cell and the second cell based on the recommended azimuth tuning angle and the second recommended azimuth tuning angle such that the cell or the second cell with a higher recommended azimuth tuning angle is tuned first.

14. The method of claim 1, wherein:
    the performance improvement associated with the cell comprises a predicted signal strength improvement.

15. The method of claim 14, further comprising:
    determining a predicted upper layer metric improvement based on the predicted signal strength improvement, wherein the predicted upper layer metric improvement comprises at least one of download speed or latency.

16. The method of claim 14, further comprising:
    determining a predicted upper layer metric improvement based on the predicted signal strength improvement, wherein the predicted upper layer metric improvement is determined by joining the predicted signal strength improvement and the predicted upper layer metric improvement.

17. The method of claim 1, further comprising:
    determining an inaccurate site parameter, corresponding to the cell, based on a distance between a site associated with the cell and a coverage center of the cell greater than a predetermined threshold, wherein the coverage center of the cell is determined based on the set of geotagged data samples associated with the cell; and
    providing the inaccurate site parameter to a user associated with the site.

18. A system comprising:
    one or more processors; and
    one or more memories storing machine-readable instructions that, when executed by the one or more processors, cause the one or more processors to perform operations comprising:

accessing a set of geotagged data samples associated with a cell, wherein the set of geotagged data samples are obtained from an application associated with one or more user equipment associated with the cell and the cell comprises at least one antenna;

determining an inaccurate site parameter, corresponding to the cell, based on a distance between a site associated with the cell and a coverage center of the cell greater than a predetermined threshold, wherein the coverage center of the cell is determined based on the set of geotagged data samples associated with the cell;

providing the inaccurate site parameter to a user associated with the site;

determining a metric associated with the cell based on the set of geotagged data samples;

generating one or more antenna adjustments based on the metric; and predicting, based on the one or more antenna adjustments, a performance improvement associated with the cell.

19. A non-transitory computer-readable medium storing machine-readable instructions that, when executed by one or more processors, cause the one or more processors to perform operations comprising:

accessing a set of geotagged data samples associated with a cell, wherein the set of geotagged data samples are obtained from an application associated with one or more user equipment associated with the cell and the cell comprises at least one antenna;

determining at least one of an overshooting of the cell or an undershooting of the cell based on an overlap of a first coverage area of the cell with a second coverage area of a second cell, wherein the first coverage area and the second coverage area are determined based on the set of geotagged data samples;

determining a metric associated with the cell based on the set of geotagged data samples;

generating one or more antenna adjustments based on the metric; and predicting, based on the one or more antenna adjustments, a performance improvement associated with the cell.

* * * * *